United States Patent [19]

Kawashima et al.

[11] Patent Number: 5,173,876
[45] Date of Patent: Dec. 22, 1992

[54] ELECTRICALLY ERASABLE AND PROGRAMMABLE NON-VOLATILE SEMICONDUCTOR MEMORY DEVICE

[75] Inventors: Hiromi Kawashima, Yokohama; Yoshinori Tsujimura, Kawasaki, both of Japan

[73] Assignees: Fujitsu Limited; Fujitsu VLSI Limited, both of Japan

[21] Appl. No.: 584,673

[22] Filed: Sep. 19, 1990

[30] Foreign Application Priority Data

Sep. 20, 1989 [JP] Japan .................. 1-244553

[51] Int. Cl.$^5$ .................................. G11C 16/06
[52] U.S. Cl. .................. 365/189.07; 365/195; 365/228
[58] Field of Search .......... 365/189.07, 195, 228, 365/189.05, 189.08, 218

[56] References Cited

U.S. PATENT DOCUMENTS 4,744,062 5/1988 Nakamura et al. ............. 365/228
4,763,305 8/1988 Kuo .................................. 365/200
4,975,878 12/1990 Boddu et al. .................. 365/228 X Primary Examiner—Joseph A. Popek
Attorney, Agent, or Firm—Nikaido, Marmelstein, Murray & Oram

[57] ABSTRACT

Where an electrically erasable and programmable non-volatile semiconductor memory element (EEPROM cell) for storing a setting and releasing of the software data protection has already been set in the logic state designating the software data protection setting state, and operation of setting the logical state designating the software data protection setting is not applied to the EEPROM cell even if the address and data for setting the software data protection is input. Further, where the logic state designating the releasing of the software data protection has been set in the electrically erasable and programmable non-volatile semiconductor memory element, the operation of setting the logical state designating the release of the software data protection is not set to the EEPROM cell, even if the address and the data for releasing the software data protection is input.

6 Claims, 11 Drawing Sheets

| Fig.7A |
|--------|
| Fig.7B |

ELECTRICALLY ERASABLE AND PROGRAMMABLE NON-VOLATILE SEMICONDUCTOR MEMORY DEVICE

BACKGROUND OF THE INVENTION

1. Field of the Invention

The present invention relates to a semiconductor memory device and more particularly to an electrically erasable and programmable non-volatile memory device, namely, an electrically erasable and programmable read only memory, called an EEPROM hereinafter.

2. Description of the Related Art

Generally speaking, an EEPROM receives a chip enable signal $\overline{CE}$, an output enable signal $\overline{OE}$ or a write enable signal $\overline{WE}$ as a control signal, and determines various modes for waiting, erasing, writing or reading based on the logical state of those signals. However, these control signals $\overline{CE}$, $\overline{OE}$ and $\overline{WE}$ are apt to be affected by variations in power source voltage or noise, and their logical states are thus confused by the variations in power source voltage or noise. As a result, sometimes a writing mode is accidentally set and error data is written, thereby resulting in an erroneous writing operation. Such erroneous writing can be avoided by providing a so-called software data protection circuit within the memory device.

Conventionally, an EEPROM equipped with a software data protection circuit, as shown in FIG. 1, is utilized.

In FIG. 1, the EEPROM comprises a row-decoder 1, a cell matrix 2, a read column decoder 3, a read column gate 4, a sense amplifier 5, an I/O buffer 6, an E/W (erase/write) column decoder 7, an E/W column gate 8 and a page register 9. It further comprises a control signal logic circuit 10, an E/W timing signal generating circuit 11, an increased voltage generating circuit 12, and a software data protection circuit 13.

In such an EEPROM, the chip enable signal $\overline{CE}$, the output enable signal $\overline{OE}$ and the write enable signal $\overline{WE}$ are put in the state shown in the following table 1, thereby enabling the EEPROM to be set in the write mode.

TABLE 1

| $\overline{CE}$ | $\overline{OE}$ | $\overline{WE}$ |
|---|---|---|
| L | H | ‾⌐_⌐‾ |

In this write mode, as shown in FIG. 2, the write address is obtained at the fall of the write enable signal $\overline{WE}$ and the write data is obtained at the rise of the write enable signal $\overline{WE}$. However, a combination of the logical values of control signals $\overline{CE}$, $\overline{OE}$ and $\overline{WE}$ for setting the write mode is sometimes wrongly set by the variation in power source voltage and noise, as described above. The software data protection circuit 13 is for preventing an erroneous write operation as caused by that described above. Software data protection circuit 13 has an EEPROM cell 13A, which sets a software data protection circuit 13 to prevent the data from being written in respective memory cells in cell matrix 2 by setting storing and maintaining a discretional logic value in EEPROM cell 13A. An address signal of 16 bits comprising, for example, the row-address and column-address input to matrix 2 and the data output from I/O buffer 6, are input to the software data protection circuit 13. The software data protection is set by sequentially providing the address and the data to the software data protection circuit 13.

That is, in the software data protection circuit 13, a writing operation is performed for the EEPROM cell 13A when (1) address=5555, data AA, (2) address=2AAA, data=55, and (3) address=5555, data=A0 are sequentially input to the software data protection circuit 13. The address and data will be expressed by a hexadecimal notation herein. Then logic "0" (conduction state) is set in the EEPROM cell 13A, thereby setting, storing and maintaining a software data protection state. Thereafter, when this state is not released, providing the address and data for setting the software data protection is not input to that circuit 13, (i.e., providing write data is not input to the circuit 13 following the address and data for setting the software data protection is not input thereto) the increased voltage VPP necessary to write the data in respective EEPROM cells forming cell matrix 2 is prevented from being output from the increased voltage generating circuit 12, thereby preventing the data from being written into respective memory cells in cell matrix 2.

Therefore, when such a software data protection circuit 13 is provided, even if the logic state of the above control signals $\overline{CE}$, $\overline{OE}$ and $\overline{WE}$ are incorrectly set by the variations in the power source voltage or noise and correspondingly logic circuit 10 for a control signal is set write mode incorrectly, the increase voltage Vpp is not applied to a control gate of respective EEPROM cell forming cell matrix 2. Thus, the data is prevented from writing into respective EEPROM cells of cell matrix 2.

When (1) address=5555, data=AA, (2) address=2AAA, data=55, (3) address=5555, data=10, (4) address=5555, data=AA, (5) address=2AAA, data=55, and (6) address=5555, data=20 are sequentially input to the software data protection circuit 13, a deletion operation is performed for EEPROM cell 13A. A logic "1" (non conductive state) is set in EEPROM cell 13A and thus the software data protection testing state is removed.

As described above, in a conventional EEPROM, when the software data protection state is set, data is not written in cell matrix 2 if an address and data for setting the software data protection is not input to EEPROM cell 13A. In other words, the software data protection state is set, the write operation is performed for EEPROM cell 13A whenever the data is written into cell matrix 2. When write mode is set, a write operation is not performed to all the EEPROM cells forming cell matrix 2. Namely, when the setting and releasing operations of software data protection are frequently performed, the writing operation for the EEPROM in the software data protection circuit 13 is performed more than that for the writing operation for the discretional EEPROM cell 13A.

In a write mode, a write operation is not carried out for all the EEPROM cells forming a cell matrix 2. Namely, the number of a write operations by which data is written in EEPROM 13A in the software data protection circuit 13 is sometimes larger than that of write operations by which data is written in other EEPROM cell forming cell matrix 2.

Therefore, in the conventional EEPROM, there is a problem that EEPROM cell 13A forming the software data protection circuit 13 deteriorates faster than the EEPROM cell forming the cell matrix 2 deteriorates.

SUMMARY OF THE INVENTION

An object of the present invention is to provide an EEPROM wherein the rate of deterioration of the EEPROM cell forming the software data protection circuit is decreased so that EEPROM cell can function for a longer period of time.

The EEPROM is equipped with a software data processing circuit having an EEPROM cell. The software data protection circuit can store and maintain the software data protection setting state by setting the EEPROM cell to one logic state, for example a logic "0" (conductive state), where it receives the address and data for setting the software data protection. The circuit can also store and maintain the software data protection releasing state by setting the EEPROM cell to be in the other logic state, for example logic "1" (non-conductive state), where it receives an address and data for removing the software data protection.

The first invention provides the logic state setting control means for controlling the logic state setting operation of the EEPROM cell so that, where the EEPROM cell is set to be in one logic state, for example, logic "0", one logic state (namely, the state of logic "0") is not repeatedly set in the EEPROM, even if the address and data for setting the software data protection is received.

An increased voltage for setting one logic state "0" is not supplied to a drain or source of the EEPROM cell. Therefore, the increased voltage for software data protection is prevented from being applied to the EEPROM cell, and the EEPROM cell for forming the software data protection circuit is prevented from being deteriorated largely.

The second invention further provides a logic state setting control circuit for controlling the logic state setting operation of the EEPROM cell so that, where the EEPROM cell is already set in the other logic state (namely, logic "1"), the other logic state (namely the state of logic "1") is not repeatedly set, even if the address and data for removing the software data protection is input.

In the second invention, in addition to the setting of the software data protection, the unnecessary increased voltage is prevented from being applied to the EEPROM upon the release of the data protection. Thus, the second invention can prevent the deterioration of the EEPROM cell for a longer period of time than the first invention.

DESCRIPTION OF THE PREFERRED EMBODIMENT

Figure 1:
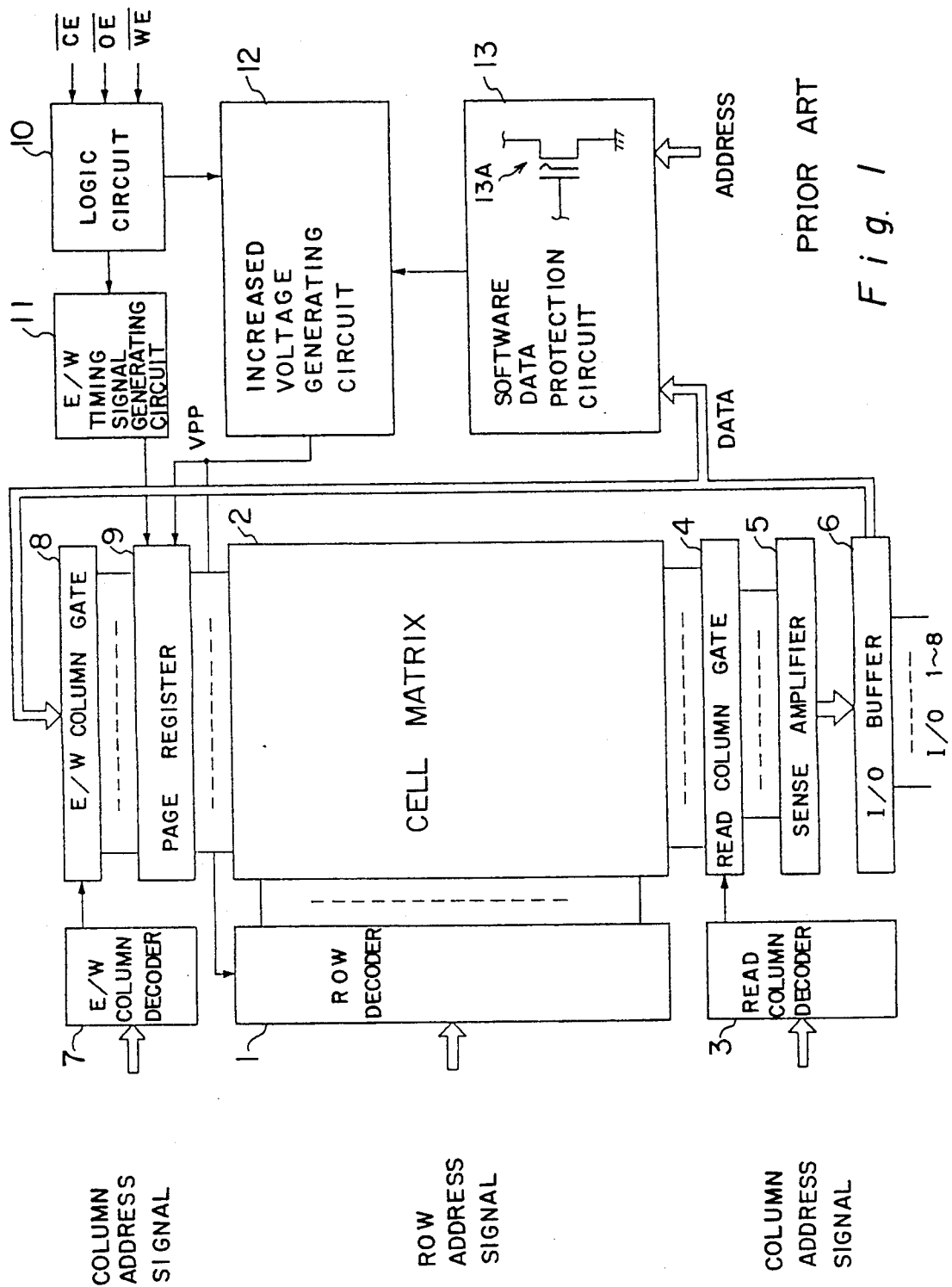
FIG. 1 shows a block diagram of a circuit of a conventional EEPROM.
Figure 2:
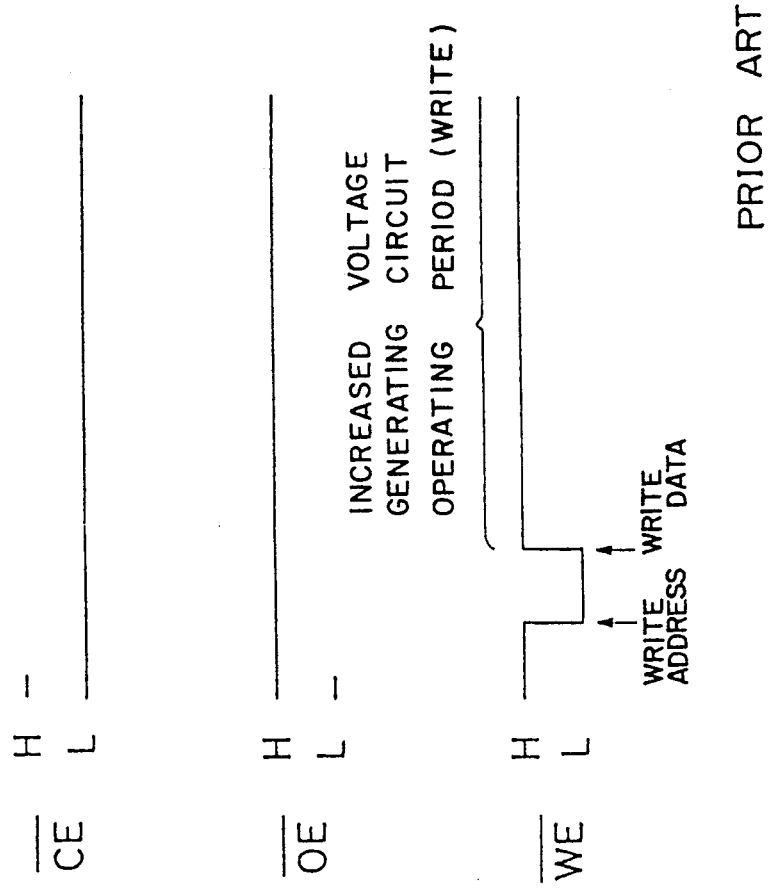
FIG. 2 shows a timing chart of the data write in the conventional EEPROM shown in FIG. 1.

The embodiment of the present invention will be described by referring to the drawings.

Figures 3, 3A:
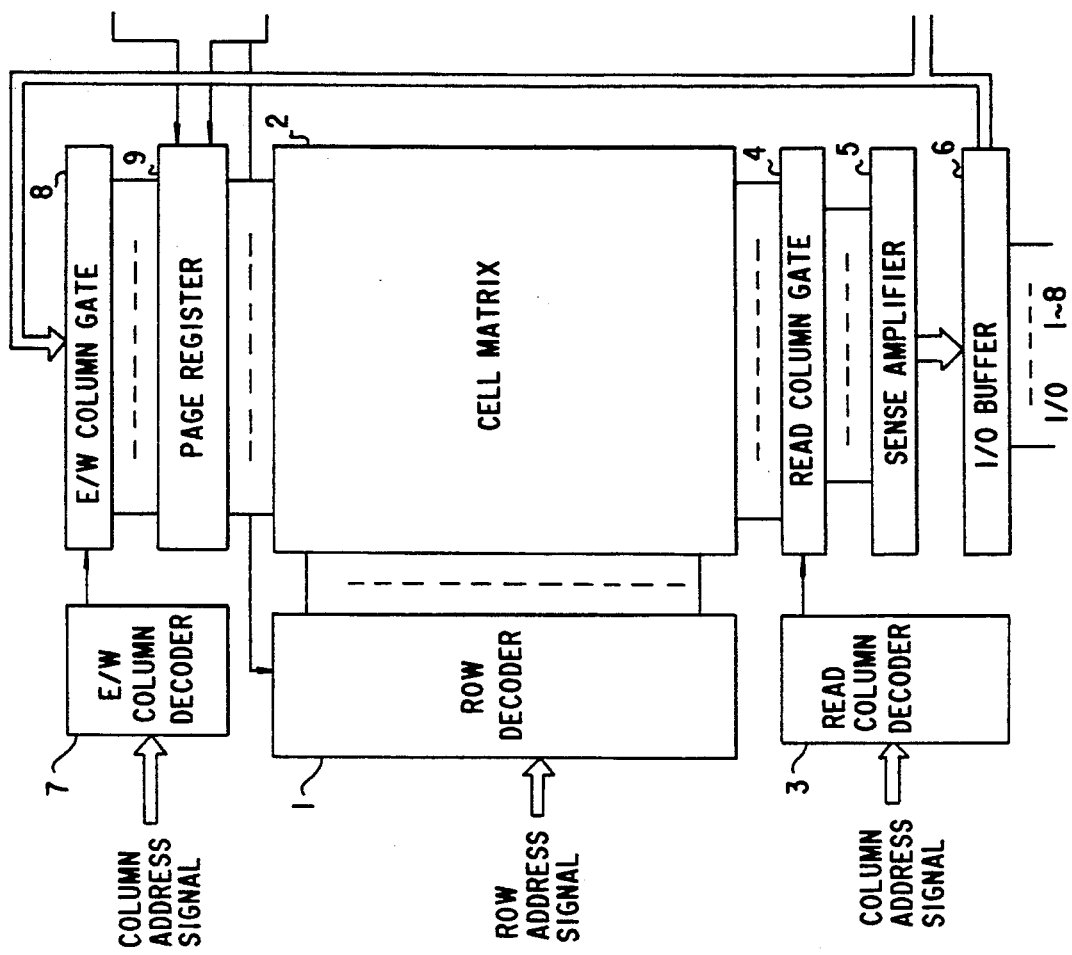
FIG. 3 shows a block diagram of an embodiment of the present invention.
Figure 3B:
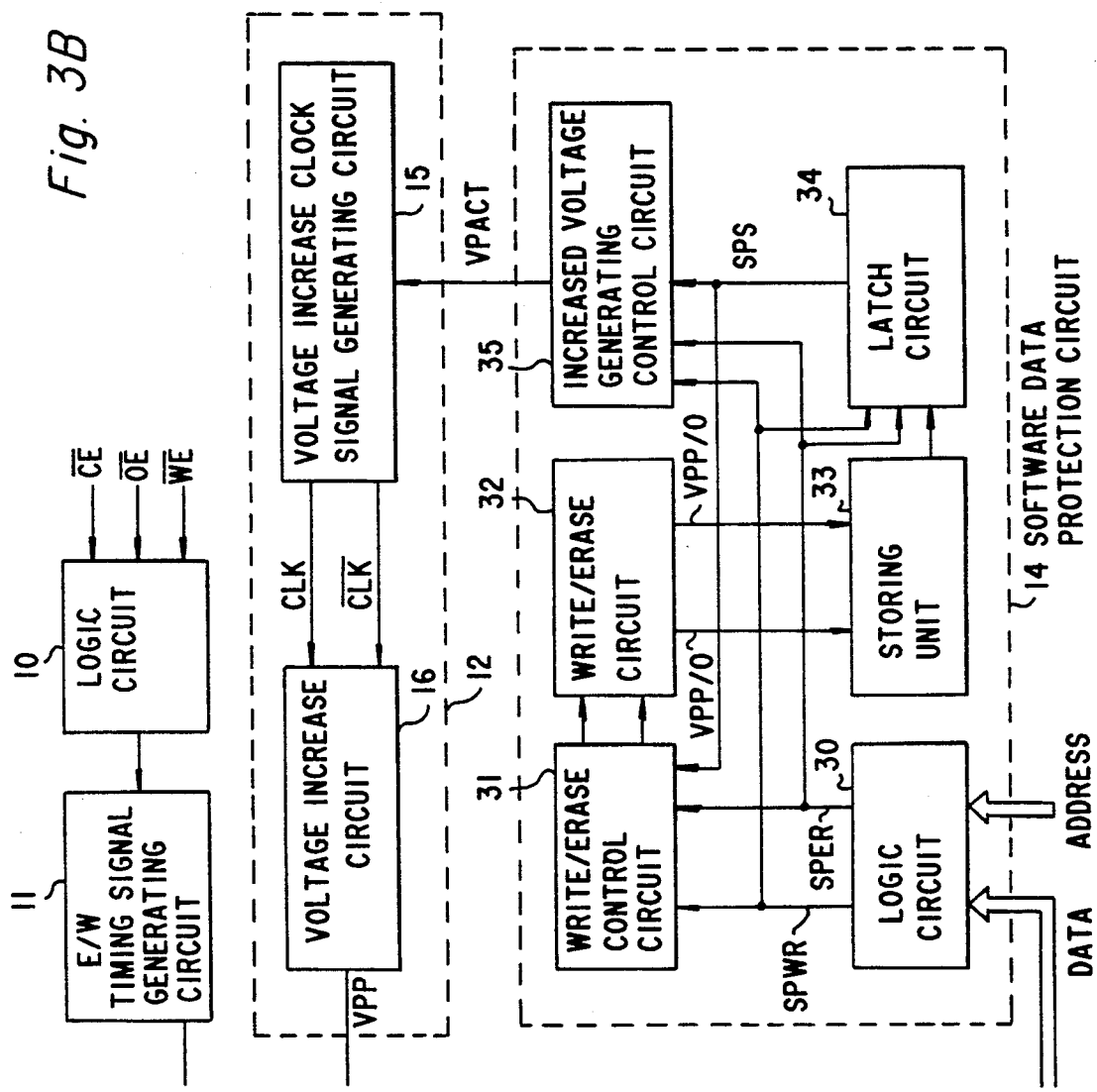

FIG. 3 shows a block diagram designating one embodiment of the present invention. In FIG. 3, the EEPROM of the present invention provides the software data protection circuit 14 with a detailed circuit shown in FIG. 4, in place of software data protection circuit 13 shown in FIG. 1 that is the prior art. The other parts of the EEPROM applicable to FIG. 3 are formed in the same manner as the prior art EEPROM shown in FIG. 1. Therefore, the same block as that shown in FIG. 1 is designated by the same reference number for FIG. 3 and the explanation of the block is abbreviated.

Figure 4A:
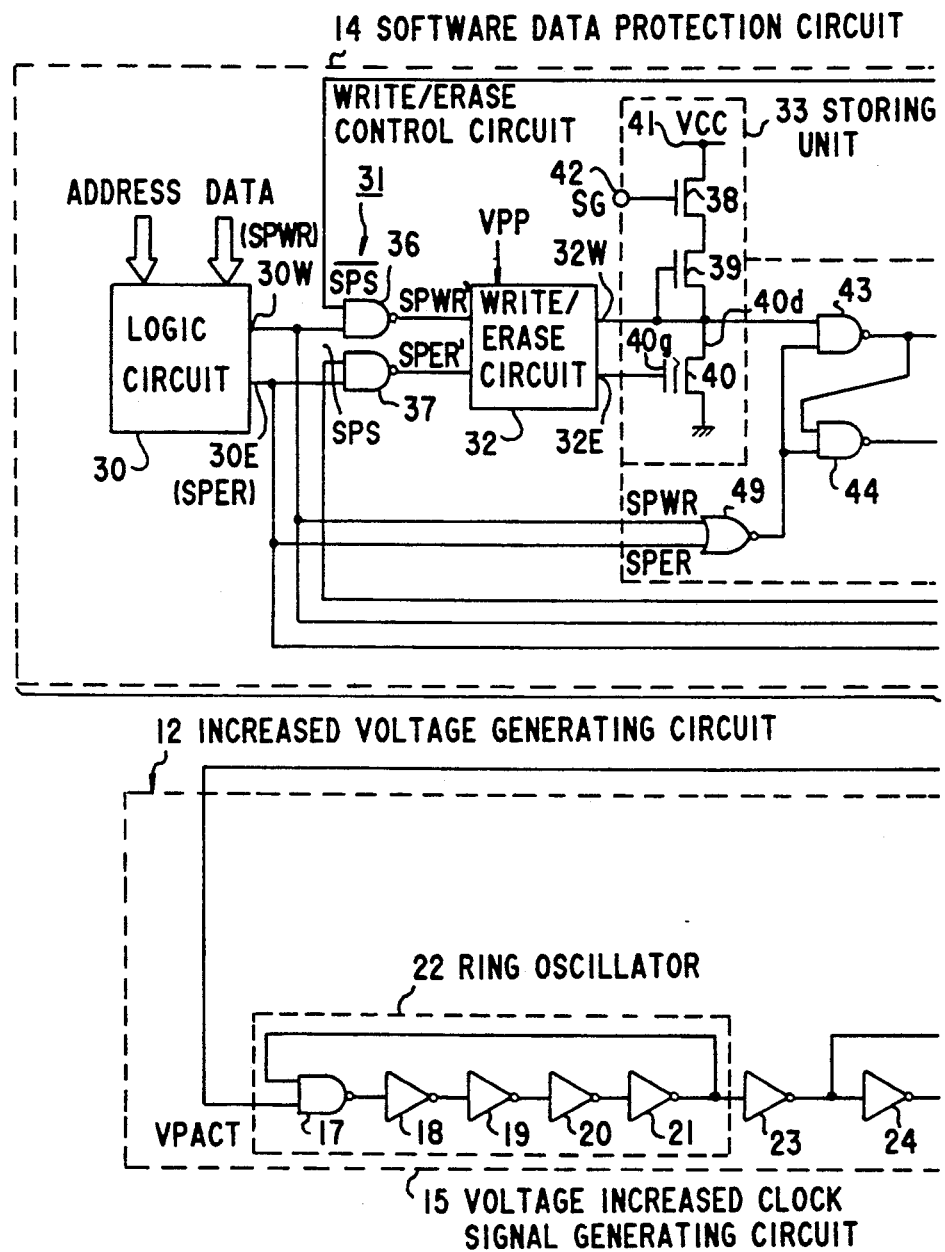
FIG. 4 shows a circuit diagram of an increased voltage generating circuit and a software data protection circuit according to one embodiment of the present invention.
Figure 4B:
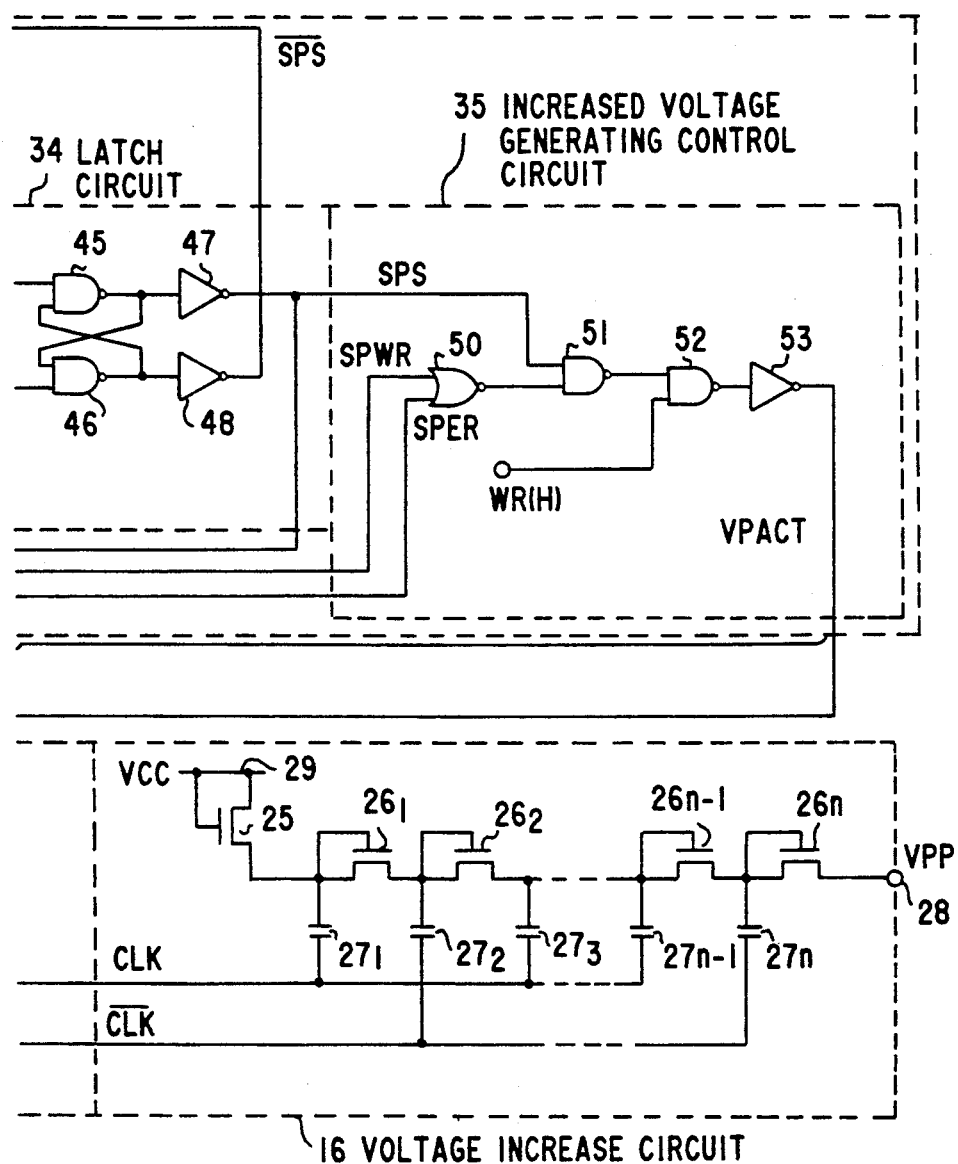

FIG. 4 shows an example of an increased voltage generating circuit 12 in the above recited software data protection circuit 14. As shown in FIG. 4, the increased voltage generating circuit 12 comprises a voltage increase circuit clock signal generating circuit 15 and a voltage increasing circuit 16. Voltage increase circuit clock signal generating circuit 15 comprises a ring oscillator 22 which incorporates NAND circuit 17 and inverters 18, 19, 20 and 21, and buffer inverters 23 and 24.

NAND circuit 17 and inverters 18, 19, 20 and 21 are connected in series and the output terminal of the inverter 21 is connected to one input terminal of NAND circuit 17, thereby forming a ring oscillator 22. The increased voltage generating control signal VPACT is input to the other input terminal of NAND circuit 17 and when increased voltage generating control signal VPACT is at a high level "H", ring oscillator 22 performs an oscillation operation. Inverters 21, 23 and 24 are connected in series and voltage increase circuit clock signal CLK and $\overline{CLK}$ are respectively output from the output terminals of the inverters 23 and 24.

Voltage increasing circuit 16 comprises n-channel MOS transistors (which will be called nMOS) 25, 26-1, 26-2 ... 26-n, for example n=20), capacitors 27-1, 27-2 ... 27-n and increased voltage output terminal 28. nMOS 25 has its drain and gate connected to power source line 29 to which power source voltage VCC (5 V) is applied and its source connected to the drain and gate of nMOS 26-1. nMOS 26-1 has its source connected to the drain and gate of nMOS 26-2. The same connection is made from nMOS 26-1 to nMOS 26-n. The source of nMOS 26-n is connected to the increased voltage outputting terminal 28. A connecting point between a drain of nMOS 26-1 and a gate thereof, a connecting point between a drain of nMOS 26-3 (not shown) and a gate thereof, ... and a connecting point between a drain of nMOS 26-n-1 and a gate thereof are connected to an output terminal of inverter 23 of the voltage increased circuit clock signal generating circuit 15 through capacitors 27-1, 27-3 ... 27-n-1, respectively. A connecting point between a drain and a gate of nMOS 26-2, a connecting point between a drain and a gate of nMOS 26-n are connected to the output terminal of the inverter 24 of increased voltage circuit clock signal generating circuit 15 through capacitors 27-2 ... 27-n.

In the voltage increasing circuit 16 constructed above, capacitors 27-1, 27-2 . . . 27-n are charged up when the voltage increased circuit clock signals CLK and $\overline{CLK}$ are applied thereto and the voltages on the side of nMOS 26-1, 26-2 . . . 26-n are sequentially increased. The increased voltage VPP of 20 V, for example, can be obtained at the increased voltage output terminal 28.

Software data protection circuit 14 comprises logic circuit 30, write erase control circuit 31, write erase circuit 32, memory unit 33, latch circuit 34 and increased voltage generating control circuit 35.

Logic circuit 30 outputs write control signal SPWR and erase control signal SPER from two output terminals 30W and 30E to write and erase control circuit 31. The write control signal SPWR and erase control signal SPER enables the setting and releasing of the software data protection and the ordinary operation (data erase, data write and data read) for cell matrix 2 when releasing the software data protection.

In this embodiment, where SPWR equalling "H" and SPER equalling "L" are output, software data protection can be set. Where SPWR equalling "L" and SPER equalling "H" are output, the software data protection can be released. Further, where both SPWR and SPER become "L" during the period when software data protection is released, then the above ordinary operation can be performed for respective EEPROM cells in cell matrix 2. The logic circuit 30 outputs the control signals SPWR and SPER when the address and data output from the external CPU (not shown) are input in a series of sequences as shown below. Namely, where the logic circuit 30 receives (1) address=5555, data=AA, (2) address=2AAA, data=55 and address=5555, data=A0 in sequence, it outputs SPWR="H" and SPER="L" for setting the software data protection. Where the logic circuit 30 receives (1) address=5555, data=AA, (2) address=2AAA, data=55, (3) address=5555, data=80, (4) address=5555, data=AA, (5) address=2AAA, data=55, and (6) address=5555, data=20 in sequence, it outputs SPWR="L" and SPER="H" for releasing the software data protection.

In the ordinary operation SPWR="L", SPER="L" are output.

Figure 5:
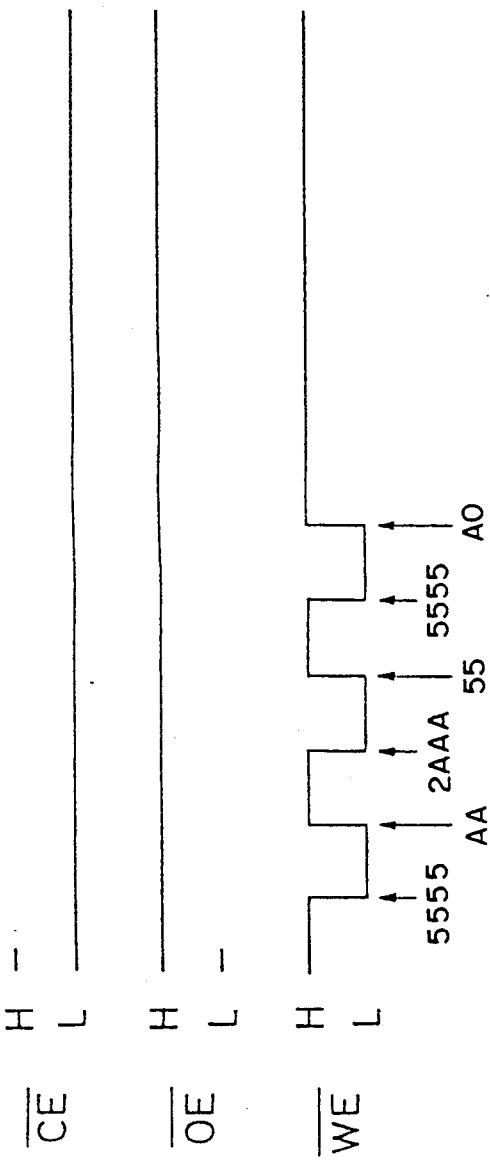
FIG. 5 shows a timing chart for obtaining an address and data for setting the software data protection, FIG. 6 designates a timing chart for obtaining an address and data for releasing the software data protection.
Figure 6:
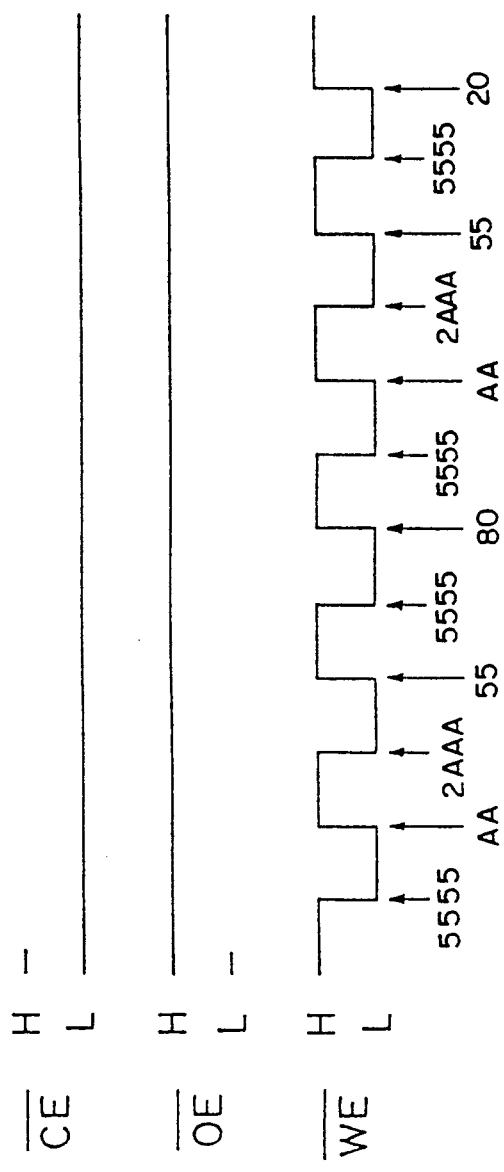

The address and data for setting the software data protection can be provided such that an address is received upon a fall of $\overline{WE}$, and data is received upon a rise of $\overline{WE}$ as shown in FIG. 5. The address and data for releasing software data protection can be provided such that the address is received upon a fall of $\overline{WE}$ and the data is received upon the rise of $\overline{WE}$.

Write erase control circuit 31 comprises NAND circuit 36 for outputting write control signal SPWR' and NAND circuit 37 for outputting erase control signal SPER'. The one input terminal of NAND circuit 36 receives a reverse signal SPS of the output signal $\overline{SPS}$ of latch circuit 34 designating whether the software data protection state is set or is released. (When the software data protection state is set, the signal SPS is at "H" and when it is released, the signal SPS is at "L".) The other input terminal of NAND circuit 36 receives the signal SPWR of logic circuit 30. NAND circuit 37 receives the output signal SPS of latch circuit 34 at one input terminal and receives the output signal SPER from logic circuit 30 at the other input terminal.

NAND circuit 36 outputs SPWR'="L" (write instruction signal=a signal for setting logic "0" in EEPROM 40) to write erase circuit 32, only when SPWR output from logic circuit 30 is at "H", namely, only when the address and data for setting the software data protection is input to the logic circuit 30 during the period of $\overline{SPS}$="H", namely, the release of the software data protection. NAND circuit 36 outputs SPWR'="H" (non-write instruction) in the case other than described above. NAND circuit 37 outputs SPER'="H" (erase instruction signal=signal for setting logic "1" in EEPROM 40) to write erase circuit 32 and outputs SPER'="H" (non erase construction signal) in the case other than described above. A write and erase circuit 32 has one and the other input terminals connected to the output terminal of NAND circuit 36 and 37 and has one and the other output terminals 32W and 32E connected to drain 40d of EEPROM cell 40 and control gate 40g thereof. Write erase circuit 32 outputs increased voltage VPP (V) and 0(V) to the output terminal 32W and 32E, respectively upon SPWR'="L" and SPER="H" and performs a write operation for EEPROM cell 40 to set logic "0" in EEPROM 40. Upon SPWR'="H" and SPER'="L", write and erase circuit 32 outputs 0(V) and increased voltage VPP(V) to output terminals 32W and 32E, respectively to perform an erase operation for EEPROM cell 40, thereby setting EEPROM cell 40 at logic "1". Write erase circuit 32 outputs 0(V) to output terminals 32W and 32E where SPWR'="L" and SPER'="L" in write mode in the above ordinary operation.

Storing unit 33 comprises nMOS 38, 39 and EEPROM cell 40 as shown in FIG. 4. nMOS 38 is a selection transistor for controlling a reading of data stored in EEPROM cell 40. nMOS 38 has its drain connected to power source line 41, its gate connected to read control circuit input terminal 42 for receiving read control signal SG and has the source connected to the drain and nMOS 39. nMOS 39 forms a load for EEPROM cell 40 and has its gate and source connected to each other. nMOS 39 also has its connection point connected to the drain of EEPROM cell 40. nMOS 39 a nMOS transistor of a depletion type. The source of EEPROM cell 40 is grounded in the drawing but is made floating upon writing of the data.

In FIG. 4, nMOS 38 operating as a selection transistor is provided on the side of the power source voltage Vcc. By reversing the connection relation between nMOS 38 and load transistor nMOS 39, load transistor nMOS 39 may be provided on the side of the power source voltage Vcc. Latch circuit 34 latches the current memory data (logic state) of EEPROM cell 40 and outputs signals SPS and $\overline{SPS}$ to NAND circuits 36 and 37, respectively and comprises NAND circuit 43, 44, 45 and 46 and inverters 47 and 48, and NOR circuit 49. NAND circuit 43 has one input terminal connected to the drain of EEPROM cell 40 and the output terminal connected to one input terminal of NAND circuit 45 and one input terminal of NAND circuit 44.

NOR circuit 49 has one and the other input terminals connected to the output terminals 30W and 30E of logic circuit 30, respectively, and has the output terminal connected to the other input terminal of NAND circuit 43 and the other input terminal of NAND circuit 44. NAND circuit 45 has the other input terminal connected to an output terminal of NAND circuit 46 and input terminal of inverter 48 and has the output terminal connected to one input terminal of NAND circuit 46 and the input terminal of inverter 47.

NAND circuit 46 has the other input terminal connected to an output terminal of NAND circuit 44. Inverter 47 has the output terminal ($\overline{SPS}$ output) connected to one input terminal of NAND circuit 37 of write erase control circuit 31. Inverter 48 (SPS output) is connected to one input terminal of NAND circuit 36 of write erase control circuit 31.

When the EEPROM cell 40 stores logic "0" (conductive state), i.e., where the software data protection state is set, SPS="H" and $\overline{SPS}$="L" are output. When the EEPROM cell 40 stores logic "1" (non conductive state), i.e., where the software data protection state is released, SPS="L" and $\overline{SPS}$="H" are output. The write erase circuit 32 performs a write operation to the EEPROM cell 40 and sets logic "0" (conductive state) in it. Thereafter, the logic circuit 30 outputs SPWR="L" and SPER="L", reads the stored data (logic "0") newly set in the EEPROM cell 40 and outputs the stored data to one input terminal of NAND circuit 43 of the latch circuit 34. Then, both SPWR and SPER are set at "L", the output of NAND circuit 49 becomes "H" and the stored data (logic "0") read from the EEPROM cell 40 is latched at latch circuit 34, thereby enabling SPS="H" and $\overline{SPS}$="L" to be output from latch circuit 34.

The write erase circuit 32 performs an erase operation on the EEPROM cell 40 and sets logic "1" in it. Thereafter, logic circuit 30 outputs SPWR="L" and SPER="L" and reads the stored data (logic "1") newly set in the EEPROM cell 40 through the write erase control circuit 31 and the write erase circuit 32. The stored data is output to one input terminal of NAND circuit 43 of the latch circuit 34 and is latched in the latch circuit 34, thereby enabling SPS="L" and $\overline{SPS}$="H" to be output from it.

The increased voltage generating control circuit 35 outputs increased voltage generating control signal VPACT to control the oscillation operation of the ring oscillator 22 of the voltage increase clock signal generating circuit 15 and comprises a NOR circuit 50, NAND circuits 51, 52 and an inverter 53. One and the other input terminals of the NOR circuit 50 are connected to one output terminal 30W and the other output terminal 30E of the logic circuit 30, respectively. One or the other input terminal of the NAND circuit 51 are connected to the output terminals of inverter 47 and the NOR circuit 50. One input terminal of the NAND circuit 52 is connected to the output terminal of the NAND circuit 51. The other input terminal of the NAND circuit 52 receives write signal WR (which becomes "H" during a normal write mode) which is produced by a control circuit (not shown) in the EEPROM and is used for the EEPROM. The output terminal of the NAND circuit 52 is connected to the input terminal of the inverter 53 and the output terminal of the inverter 53 is connected to the other input terminal of the NAND circuit 17 of the voltage increase circuit clock signal generating circuit 15.

The relationship between SPS, SPWR, SPER, and VPACT in the increased voltage generating control circuit 35 are expressed as shown in the following Table 2.

TABLE 2

| SPS | H | H | H | L | L | L |
|---|---|---|---|---|---|---|
| SPWR | L | H | L | L | H | L |
| SPER | L | L | H | L | L | H |

TABLE 2-continued

| VPACT | L | H | H | H | H | H |
|---|---|---|---|---|---|---|

As is clear from this table, where SPS="H" (i.e. when the software data protection state is set) SPWR="L" and SPER="L" (i.e. the write mode in the normal operation) and VPACT="L". Therefore, in this case the ring oscillator 22 of the voltage increase circuit clock signal generating circuit 15 stops the oscillation operation. Therefore, the increased voltage VPP used for data erase and write for respective EEPROM cells in the cell matrix 2 is not output from the voltage increasing circuit 16. This prevents data from being written in the EEPROM cell in matrix 2. On the other hand, where the software data protection state is set, either SPWR or SPER is made "H" and the address and data for setting and releasing the software data protection state is input to the logic circuit 30. When the write data is supplied to the cell matrix 2, or where SPS="L" (i.e., the software data protection state is released), VPACT="H". Regardless of the address of the logic state of SPWR and SPER. In this case, the ring oscillator 22 of the voltage increase clock signal generating circuit 15 performs an oscillation and increased voltage VPP is output from the voltage increasing circuit 16. Therefore, data write and erase to the cell matrix 2 becomes possible.

As described above, the present embodiment can realize a software data protection function by writing and storing a logic "0" in the EEPROM cell 40.

The relationship between the logic state of signals SPS, SPWR, SPER and VPACT and the voltages of output terminals 32W and 32E of the write erase circuit 32 are shown in table 3.

TABLE 3

| SPS | H | H | H | L | L | L |
|---|---|---|---|---|---|---|
| SPWR | L | H | L | L | H | L |
| SPER | L | L | H | L | L | H |
| VPACT | L | H | H | H | H | H |
| 32W | 0 | 0 | 0 | 0 | VPP | 0 |
| 32R | 0 | 0 | VPP | 0 | 0 | 0 |

Even if SPS="H" in a write mode (i.e., the state of the software data protection is set) the logic circuit 30 outputs SPWR="H" and SPER="L" to set the software data protection. However, the voltages at output terminals 32W and 32E of the write erase circuit 32 are made 0(V), the write operation (i.e., the writing of logic "0" for setting the software data protection) is not performed for the EEPROM cell 40 in which logic "0" has already been stored.

In other words, when the logic state "0" for setting the software data protection is already stored in the EEPROM cell 40, even if SPWR="H" for setting the software data protection is output from the logic circuit 30, $\overline{SPS}$="L" is input to one input terminal of the NAND circuit 36 of write erase control circuit 31. Thus, SPWR', applied to the write erase circuit 32, is maintained at "H" (non-write instruction signal) and the write erase circuit 32 does not write the logic "0" (for setting the software data protection) in EEPROM cell 40. That is, when the EEPROM cell 40 stores the logic "0" for setting the software data protection, the operation of writing logic "0" in the EEPROM cell 40 again is prevented.

Where SPS="L" in the write mode, namely, where the software data protection state is released, even if SPWR="L" and SPER="H", the voltage of the output terminals 32W and 32E of the write erase circuit 32 are made 0 (V). Thus, the erase operation, namely, the operation of writing logic "1", is not performed for EEPROM cell 40, in which logic "1" is already stored.

In other words, when the logic state "1" for releasing the software data protection is already stored in the EEPROM cell 40, even if SPER="H" for releasing the software data protection is output from the logic circuit 30, SPS="L" is input to one input terminal of NAND circuit 37 of the write erase control circuit 31. Thus, SPER', applied to the write erase circuit 32 is maintained at "H" (non-erase instruction signal) and thus the write erase circuit 32 does not write logic "1" (for releasing the software data protection) in EEPROM cell 40. That is, when the EEPROM cell 40 stores logic "1" for releasing the software data protection, the operation of writing logic "1" in it again is prevented.

The present embodiment reads and stores in latch circuit 34 the logic state (store data) of EEPROM cell 40 which stores the setting state or releasing state of the software data protection, every time a switching operation for setting or releasing the software data protection is conducted. Then, the present embodiment prevents the same logic state as that stored in the EEPROM cell 40 from being set therein by using the write and erase control circuit 31, based on the signals SPS and $\overline{SPS}$ for setting and releasing the software data protection and output from the latch circuit 34. Thus, unnecessary write and erase operations conventionally conducted for the EEPROM cell 40 can be avoided.

This decreases the number of write and erase operations to the EEPROM cell 40 and thus prevents its deterioration and maintains its functionability for a longer time.

The above embodiment can prevent the same data from being written into the EEPROM cell 40 again. It can also prevent the erase operation from being performed repeatedly. It is operable even if only repeated writing of the same data into EEPROM cell 40 is prevented. This case can achieve almost the same effect as the above embodiment although its advantage is not as great.

Figures 7, 7A:
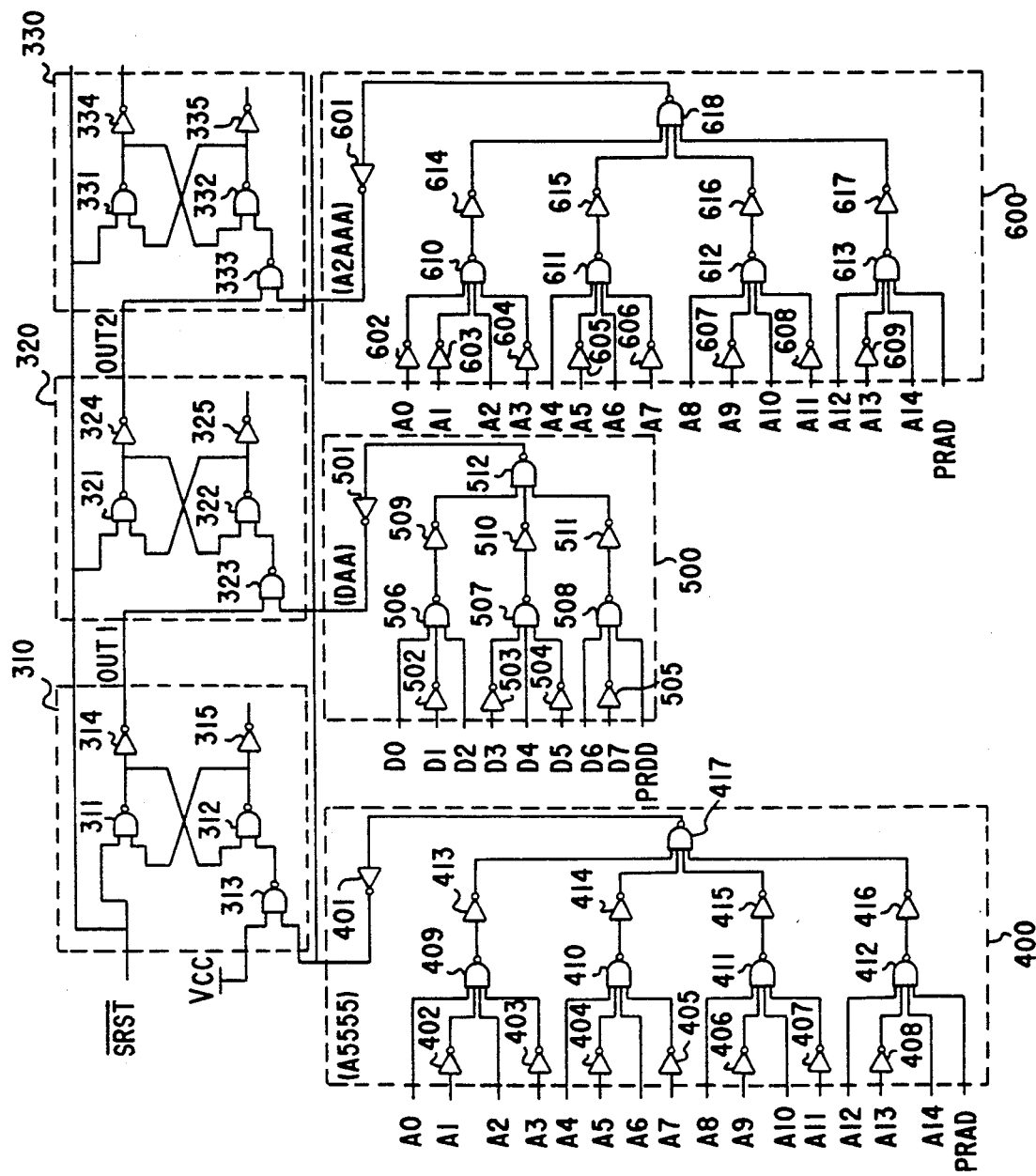
FIG. 7 shows a detailed circuit diagram of a logic circuit used in the software protection circuit in the embodiment shown in FIG. 4.
Figure 7B:
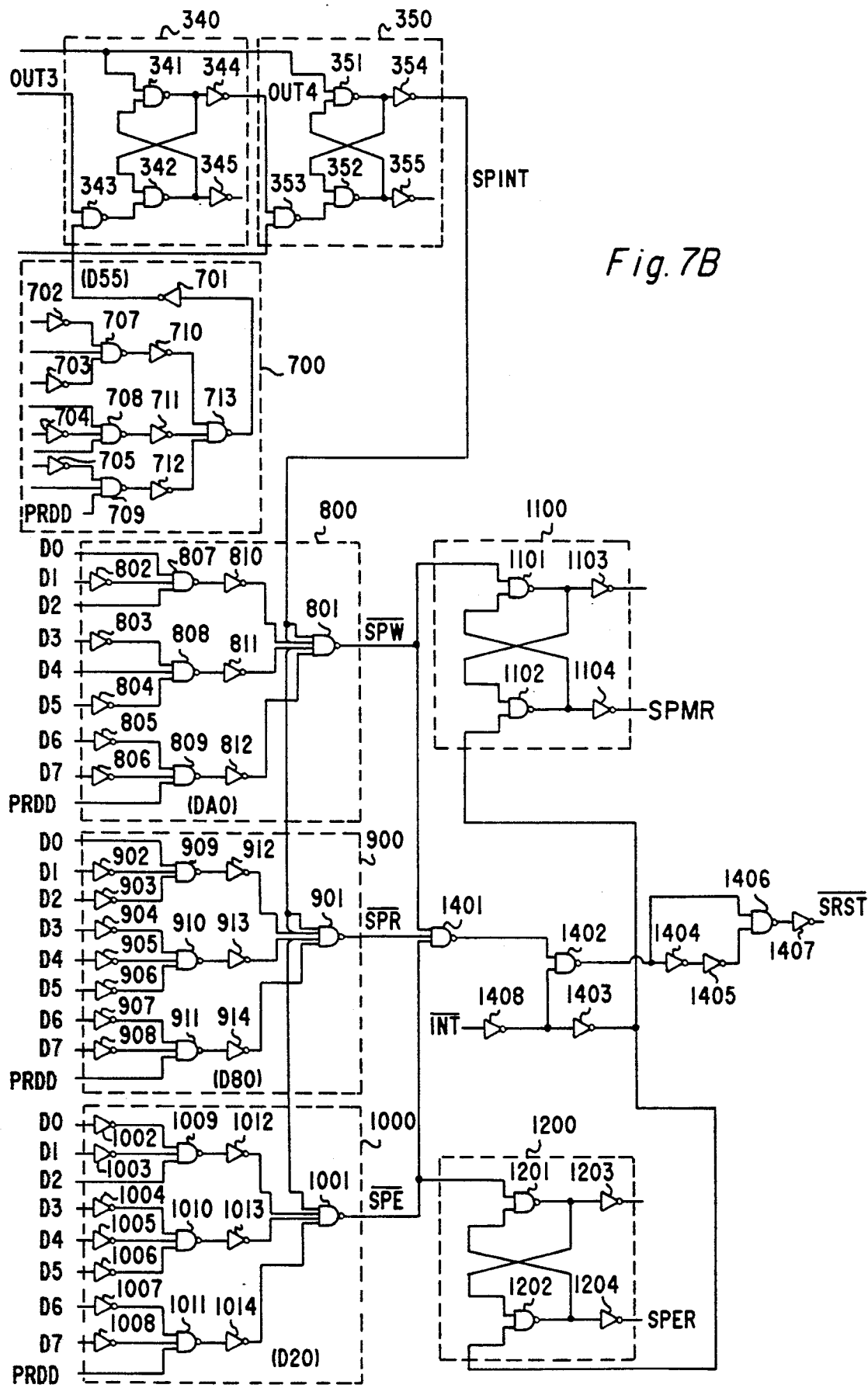

FIG. 7 shows a detailed circuit structure of the logic circuit 30. As shown in FIG. 7, the logic circuit 30 comprises five flip-flops 310, 320, 330, 340 and 350 connected in series. The output terminal of the inverter 354 of flip-flop 350 in the last stage is connected to one input terminal of four input NAND circuits 801, 901 and 101.

The above five flip-flops circuits 310, 320, 330, 340 and 350 have the same circuit configuration and thus the explanation will be made as to flip-flip 310.

Flip-flop 310 is a reset flip-flop (called R-S-FF hereinafter) comprising a NAND circuit 311, NAND circuit 312, 313 whose output terminal is connected to the other input terminal of NAND circuit 312, an inverter circuit 314 whose input terminal is connected to the output terminal of NAND circuit 312, and an inverter 315 whose input terminal is connected to the output terminal of NAND circuit 312. The output of inverter 314 is connected to one input terminal of NAND circuit 323 of flip-flop circuit 320 in the next stage, thereby forming a serial connection of flip-flop circuit 310 and flip-flop circuit 320. Flip-flop circuits 320, 330, 340 and 350 are connected in series as described above. One input terminal of NAND circuits 311, 321, 331, 341 and 351 of respective flip-flop circuits 310, 320, 330, 340 and 350 receive signal $\overline{SRST}$ to be output from inverter 1407 to reset flip-flop circuits 310, 320, 330, 340 and 350. One input terminal of flip-flop circuit 310 is connected to power source voltage Vcc (5 V) and is normally kept at "H". The other input terminal is connected to the output terminal of inverter 401. The output terminal of inverter 361 is also connected to the other input terminal of NAND circuit 353 of flip-flop 350.

Address selection circuit 400 receives 15 address signals $A_0$–$A_{14}$ and a control signal PRAD output from a control unit (not shown). Address selection signal 400 comprises NAND circuit 409 for receiving address signals $A_0$ and $A_2$ and address signals $A_1$ and $A_3$ through respective inverters 402 and 403, NAND circuit 410 for receiving address signals $A_4$ and $A_6$ and address signals $A_5$ and $A_7$ through respective inverters 404 and 405, NAND circuit 411 for receiving address signals $A_8$ and $A_{10}$ and for receiving address signals $A_9$ and $A_{11}$ through respective inverters 406 and 407 and NAND circuit 412 for receiving address signals $A_{12}$ and $A_{14}$ and for receiving address signals PRDD and $A_{12}$ through the inverter 408. It further comprises NAND circuit 417 for receiving the outputs of NAND circuits 409, 410, 411 and 412 through respective inverters 413, 414, 415 and 416 and inverter 401 for providing the output to the other input terminal of NAND circuit 417. Address selection circuit 400 turns the output of inverter 401 to "H" only when the 16-bit address comprising address signals $A_0$ to $A_{14}$ and signal PRAD becomes "5555", thereby providing "H" to NAND circuit 313 of flip-flop circuit 310.

Data selection circuit 500 receives 8-bit data signals $D_0$–$D_7$ and output signal PRDD of a control unit (not shown) and comprises NAND circuit 506 for receiving data signals $D_0$ and $D_2$ and for receiving data signal $D_1$ through inverter 502, NAND circuit 507 for receiving data signal $D_4$ and for receiving data signals $D_3$ and $D_5$ through resepctive inverters 503 and 504, and NAND circuit 508 for receiving data signal $D_6$ and signal PRDD, and data signal $D_7$ through inverter 505.

It further comprises NAND circuit 512 for receiving the outputs of NAND circuits 506, 507 and 508 through respective inverters 509, 510 and 511, and inverter 501 for receiving the output of NAND circuit 512 and providing the output to the other input terminal of NAND circuit 323 of flip-flop circuit 320.

The data selection circuit 500 turns the output of inverter 501 to "H" only when data signals $D_0$–$D_7$ become "AA" and the signal PRDD becomes "H", thereby providing "H" signal to NAND circuit 323 of flip-flop circuit 320.

Address selection circuit 600 receives 15 address signals $A_0$–$A_{15}$ and a control signal PRAD of a control unit (not shown) in the same manner as in address selection circuit 400. Address selection signal 600 comprises NAND circuit 610 for receiving address signal $A_2$ and address signals $A_0$, $A_1$ and $A_3$ through respective inverters 602, 603 and 604, NAND circuit 611 for receiving address signals $A_4$ and $A_6$ and address signals $A_5$ and $A_7$ through respective inverters 605 and 606, NAND circuit 612 for receiving address signals $A_8$ and $A_{10}$ and for receiving address signals $A_9$ and $A_{11}$ through respective inverters 607 and 608, and NAND circuit 613 for receiving address signals $A_{12}$ and $A_{14}$ and for receiving the signal PRAD and the address signal $A_{12}$ through the inverter 609. It further comprises NAND circuit 618 for receiving the outputs of NAND circuits 610, 611, 612 and 613 through respective inverters 614, 615, 616 and 617 and inverter 601 for receiving the output of NAND circuit 618 and for providing the output to NAND circuit 333 in flip-flop circuit 330. Address selection circuit 600 turns the output of inverter 601 to "H" only when the 16-bit address comprising address signals $A_0$ to $A_{15}$ and signal PRAD becomes "2AAA(H), thereby providing "H" to NAND circuit 333 of the flip-flop circuit 330.

Data selection circuit 700 receives 8-bit data signals $D_0$–$D_7$ and control output signal PRDD of a control unit (not shown) and comprises NAND circuit 707 for receiving data signal $D_1$ and for receiving data signals $D_0$ and $D_2$ through inverters 702 and 703, NAND circuit 708 for receiving data signals $D_3$ and $D_5$ and for receiving data signals $D_4$ through respective inverter 710, and NAND circuit 709 for receiving data signal $D_7$ and control signal PRDD and for receiving data signal $D_6$ through inverter 708.

It further comprises NAND circuit 713 for receiving the outputs of NAND circuits 710, 711 and 712 through respective inverters 710, 711 and 712, inverter 701 for receiving the output of NAND circuit 713 and providing the output to the other input terminal of NAND circuit 343 of flip-flop circuit 340.

The data selection circuit 700 turns the output of inverter 701 to "H" only when data signal $D_0$–$D_7$ becomes "55" and the control signal PRDD becomes "H", thereby providing "H" signal to the other input terminal of NAND circuit 343 of flip-flop circuit 340.

The logic circuit further comprises data selection circuits 800, 900 and 1000, which receive 8-bit data signals $D_0$–$D_7$ and control signal PRDD in the same as data selection circuit 500 and 700.

Data selection circuit 800 comprises NAND circuit 807 for receiving data signals $D_0$ and $D_2$ and for receiving data signal $D_1$ through inverter 802, NAND circuit 808 for receiving data signal $D_4$ and for receiving data signals $D_3$ and $D_5$ through inverters 803 and 804 and NAND circuit 809 for receiving control signal PRDD and for receiving data signals $D_6$ and $D_7$ through respective inverters 805 and 806.

NAND circuits 807, 808 and 809 provide outputs to NAND circuit 801 through respective inverters 810, 811 and 812. The output signal $\overline{SPW}$ from NAND circuit 801 is supplied to one input terminal of NAND circuit 1101 of flip-flop circuit 1100 and three-input NAND circuit 401.

The data selection circuit 800 produces the output "H" from NAND circuit 801, only when the 8-bit data signal comprising data signals $D_0$ to $D_7$ becomes "A0" and control signal PRDD becomes "H".

Data selection circuit 900 comprises NAND circuit 909 for receiving data signal $D_0$ and for receiving data signals $D_1$ and $D_2$ through respective inverters 902 and 903, NAND circuit 910 for receiving data signals $D_3$, $D_4$ and $D_5$ through respective inverters 904, 905 and 906 and NAND circuit 911 for receiving control signal PRDD and for receiving data signals $D_6$ and $D_7$ through respective inverters 907 and 908. It further comprises NAND circuit 901 for receiving the output of NAND circuits 909, 910 and 911 through respective inverters 912, 913 and 914. The output signal $\overline{SPR}$ of NAND circuit 901 is input to NAND circuit 1401. The data selection circuit 900 produces the output "H" from NAND circuit 1001 only when the 8-bit data comprising data signals $D_0$ to $D_7$ becomes "20" and control signal PRDD becomes "H", thereby providing "H" signal to NAND circuit 1401.

Data selection circuit 1000 comprises NAND circuit 1009 for receiving data signal $D_2$ and for receiving data signals $D_0$ and $D_1$ through inverters 1002 and 1003, NAND circuit 1010 for receiving data signals $D_3$, $D_4$ and $D_5$ through inverters 1004, 1005 and 1006 and NAND circuit 1011 for receiving signal PRDD and for receiving data signal $D_6$ and $D_7$ through inverters 1007 and 1008, and NAND circuit 1001 for receiving the outputs of NAND circuits 1009, 1010 and 1011 through respective inverters 1012, 1013 and 1014. The output signal SPE of NAND circuit 1001 is applied to one input terminal of NAND circuit 1201 in flip-flop circuit 1200 and NAND circuit 1401.

Data selection circuit 1000 produces the output "H" from NAND circuit 1001 only when data signals $D_0$–$D_7$ become "20" and controls signal PRDD becomes "H", thereby providing "H" to NAND circuit 1401 and to one input terminal of NAND circuit 1201 of flip-flop circuit 1200.

NOR circuit 1402 has one input terminal connected to the output terminal of NAND circuit 1401 and the other input terminal receive signal $\overline{INT}$ of a falling pulse upon a rise of the power source Vcc after the signal $\overline{INT}$ is inverted by inverter 1408.

Inverter 1403 inverts the output of inverter 1408, signal $\overline{INT}$, and provides the output to the other input terminal of NAND circuit 1102 of flip-flop circuit 1100 and to the other input terminal of NAND circuit 1202 of flip-flop circuit 1200. The output terminal of NOR circuit 1402 is directly connected to one input terminal of NAND circuit 1406 and is connected to the other input terminal of NAND circuit 1406 through inverters 1404 and 1405. The output of NAND circuit 1406 forms the signal $\overline{SRST}$ through inverter 1407 so that the signal $\overline{SRST}$ is input to one input terminal of NAND circuit 311 in flip-flop circuit 310.

Flip-flop circuit 1100 comprises an R-S-FF formed of NAND circuits 1101 and 1102, inverter 1103 for inverting the output of NAND circuit 1101 and inverter 1104 for inverting the output of NAND circuit 1102 and providing the output of inverter 1104 to write erase control circuit 31 shown in FIG. 4 as the write control signal SPWR.

Flip-flop circuit 1200 comprises NAND circuits 1201 and 1202 for forming an R-S-FF and inverter 1203 for inverting the output of NAND circuit 1201 and inverter 1204 for inverting the output of NAND circuit 1202. The output of inverter 1204 is supplied to write erase control circuit 31, shown in FIG. 4 as erase control signal SPER.

In the above structure of logic circuit 30, address signals $A_0$–$A_{15}$ and data signals $D_0$–$D_7$ are respectively supplied through an address bus and a data bus from an external control circuit (comprising a micro processor, for example), not shown.

The operation of logic circuit 30 will be explained sequentially as follows.

When the power source Vcc rises, the signal $\overline{INT}$ falls, thereby producing a falling pulse. This causes the output signal $\overline{SRST}$ of inverter 1407 to also become a falling pulse, similar to the signal $\overline{INT}$. When the signal $\overline{SRST}$ from "H" to "L", flip-flop circuits 3010, 3020, 3030, 3040 and 3050, connected in series, are reset and outputs OUT1, OUT2, OUT3, OUT4 and SPINT from the flip-flop circuits become "L". The control signal PRDD is kept at "H". The explanation will be made for the case where write control signal SPWR is set at "H"

and erase control signal SPER is set at "L" to set the software data protection. In this case, (1) when the address signal "5555" is output on the address bus, data signal "AA" is output on the data bus.

(2) when address signal "2AA" is output on the address bus, data signal "55" is output on the data bus.

(3) and finally, when the address signal "5555" is output on the address bus, data signal "A0" is output on the data bus.

By sequentially outputting the address signals and data signals on the address bus and data bus in the order (1), (2) and (3), the output $\overline{SPW}$ of NAND circuit 801 of data selection circuit 800 changes from "H" to "L" and then output signal SPWR of flip-flop circuit 1100 becomes "H". At this time, the output signal $\overline{SPE}$ of data selection circuit 1000 is kept at "H" and flip-flop circuit 1200 provides the "L" of the output signal SPER.

The address signals "5555" in the above (1), changes the output of inverter 401 of address selection circuit 400 from "L" to "H" so that "H" is input to the other input terminal of NAND circuit 313 of flip-flop circuit 310. Thus, output signal OUT1 of flip-flop circuit 310 becomes "H" and is input to one input terminal of NAND circuit 312 of flip-flop circuit 320 in the next stage. A further data signal "AA", the output of inverter 501 of data selection circuit 500 from "L" to "H", is output in the above (1), thereby providing "H" to the other input terminal of NAND circuit 323 of flip-flop circuit 320, and outputting signal OUT2 of flip-flop circuit 320 to be provided to one terminal of NAND circuit 333 of flip-flop circuit 330 in the next stage.

Next, when address signal "2AAA" and data signal "55" in the above (2) are output, output signal OUT3 of flip-flop circuit 330 and output signal OUT4 of flip-flop circuit 340 sequentially become "H", in the same manner as described above. Further, as described in (3) above, when address signal "5555" is output, the output signal SPINT of flip-flop circuit 350 becomes "H" and "H" is input to NAND circuit 801 of data selection circuit 800. Then, as described (3) above, when data signal "A0" is output, output signal SPW of data selection circuit 800 changes from "H" to "L" and output signal SPWR of inverter 1104 of flip-flop circuit 1100 becomes "H", so that the output signal SPWR is provided to the write erase control circuit 31. However, the output signal $\overline{SPE}$ of NAND circuit 1001 of data selection circuit 1000 is kept at "H", and output signal SPER of inverter 1204 of flip-flop circuit 1200 is kept at "L", so that "L" is applied to write erase control circuit 31. Therefore, the address signal and data signal are output in the order (1) to (3) above and SPWR="H" and SPER="L" are output through write erase control circuit 31. Thus, write erase control circuit 31 controls write erase circuit 32 as described before, so that the logic "0" designating the setting of the software data protection is written in EEPROM cell 40 in storing unit 33, shown in FIG. 4.

Next, the case where write control signal SPWR is set at "L" and erase control signal SPER is set at "H" to remove the software data protection will be explained. In this case, (1) when address signal "5555" is output on the address bus, data signal "AA" is output on the data bus.

(2) when address signal "2AAA" is output on the address bus, data signal "55" is output on the data bus.

(3) when address signal "5555" is output on the address bus, data signal "80" is output on the data bus.

(4) when address signal "5555" is output on the address bus, data signal "AA" is output on the data bus.

(5) when address signal "2AAA" is output on the address bus, data signal "55" is output on the data bus, and (6) when address signal "5555" is output on the address bus, data signal "20" is output on the data bus.

When address signals and data signals are output on the address bus and data bus, respectively, in the order (1) to (6) as described above, the address signals and the data signals, as described in (1) to (3) above, set the outputs of flip-flop circuits 310, 320, 330, 340 and 350 to "L". When they are in the output order (4)–(6), the address signal and data signals are output and the output signal SPE of data selection circuit 1000 changes from "H" to "L". Thus, the output signal SPER of inverter 1204 of flip-flop circuit 1200 becomes "H". At this time, the output signal $\overline{SPW}$ of data selection circuit 800 is kept at "H" and the output signal SPWR from flip-flop circuit 1100 becomes "L".

That is, the address signal "5555" and data signal "AA" described in (1) above sequentially set the output OUT1, OUT2 of flip-flop circuits 310 and 320 to "H". Address signal "AAAA" and data signal "55", as described in (2) above, set outputs OUT3 and OUT4 of flip-flop circuits 330 and 340 to "H". Further, address signal "5555" described in (3) above, sets the output signal SPINT of flip-flop circuit 350 at "H" and then when data signal "80" is output, output signal $\overline{SPR}$ of NAND circuit 901 of flip-flop circuit 900 changes from "H" to "L". Therefore, the output of NAND gate 1401 becomes "H" and the output $\overline{SRST}$ of inverter 1407 changes from "H" to "L". As the output $\overline{SRST}$ changes from "H" to "L", all the outputs of flip-flop circuits 310, 320, 330, 340 and 350 are reset to "L".

The address signals and data signals are sequentially output in the above (4) and (5) in the same way as in (1) and (2) above. Thus, the output OUT4 of flip-flop circuit 340 becomes "H". Next, in (6) above, address signal "5555" is output. Thus, the output signal SPINT of flip-flop circuit 350 becomes "H" and a further data signal "20" is output. Thus, the output signal $\overline{SPE}$ of flip-flop circuit 1000 changes from "H" to "L", but output signal $\overline{SPW}$ of flip-flop circuit 800 is maintained at "H". Therefore, the output signal SPWR of flip-flop circuit 1100 is set at "L" and the output signal SPER of flip-flop circuit 1200 is set at "H". These output signals SPWR and SPER are input to write erase control circuit 31. As the address signals and data signals are output in the order shown in (1)–(6), write erase control circuit 31 receives SPWR="L" and SPER="H", thereby enabling write erase control circuit 31 to enable write erase circuit 32 to write logic "1" into EEPROM cell 40 of storing unit 33 in order to remove the software data protection.

Figure 8:
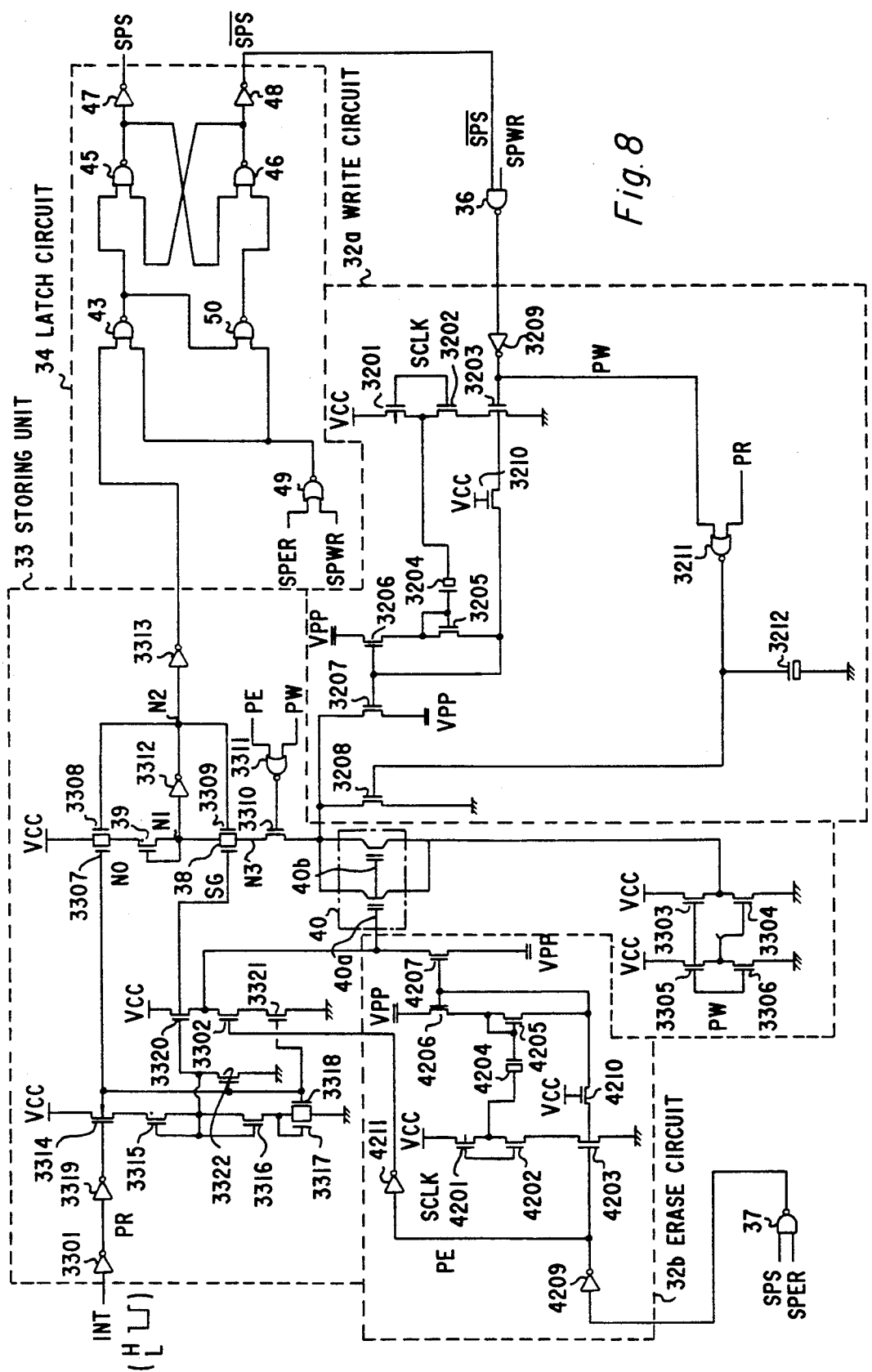
FIG. 8 shows a detailed circuit diagram of a write and erase circuit and memory unit of the software data protection circuit in the embodiment shown in FIG. 4.

FIG. 8 shows the detailed circuit structure of the write erase control circuit 31, the write erase circuit 32, the storing unit 33 and the latch circuit 34 shown in the embodiment shown in FIG. 4.

The write erase circuit 32 comprises a write circuit 32a and an erase circuit 32b.

First, in the following explanation, the transistor, not specifically recited as being of the depletion type, is of the enhancement type. Write circuit 32a comprises PMOS 3201, nMOS 3202 and nMOS 3203 connected in series between power source voltage Vcc and ground, MOS capacitor 3204 connected between the source of PMOS 3201 and the drain of nMOS 3202, nMOS 3205 of the depletion type connected to the other terminal of MOS capacitor 3204 and whose gate and drain are connected, PMOS 3206 having its source and gate respectively connected to the drain and source of nMOS 3205 and having its drain connected to the power source Vpp, PMOS 3207 having its gate connected to the source of depletion type nMOS 3205 and its source connected to the power source voltage Vpp, PMOS 3208 having its drain commonly connected to the drain of PMOS 3207 and its source connected to ground, inverter 3209 having the output of NAND gate 36 of the write erase control circuit 31 connected to the input terminal and having the output PW connected to the gate of PMOS 3203 and to the drain of transfer gate 3210, NOR circuit 3211 for receiving the output PW of inverter 3209 and for receiving the output PR of inverter 3301 in the storing unit 33. MOS capacitor 3212 has one of its terminals connected to the output terminal of NOR circuit 3211 and the other connected to ground. The gates of PMOS 3201 and nMOS 3202 receive a clock signal SCLK of a predetermined duty ratio. This signal is generated from a clock generator, not shown, which operates when an "H" of write control signal SPWR is transmitted, and the source of transfer gate 3210 is connected to the source of nMOS 3205 of the depletion type and the gate of nMOS 3207 and of nMOS 3206. The gate of transfer gate 3210 is connected to the power source voltage Vcc.

Erase circuit 32b has a similar configuration to that of write circuit 32a.

Erase circuit 32b comprises PMOS 4201, nMOS 4202, and nMOS 4203 which are connected in series between power source voltage Vcc and ground, MOS capacitor 4204 connected between the source of PMOS 4201 and the drain of nMOS 4202, nMOS 4205 of the depletion type connected to the other terminal of MOS capacitor 4204 and whose gate and drain are connected, PMOS 4206 whose source and gate are respectively connected to the drain and source of nMOS 4205 and whose drain is connected to the power source voltage Vpp, PMOS 4207 whose gate is connected to the source of depletion type nMOS 4205 and whose source is connected to the power source voltage Vpp, inverter 4209 having an input connected to the output of NAND gate 37 of write erase control circuit 31 and whose output PE is connected to the gate of PMOS 4203 and to the drain of transfer gate 4210, inverter 4211 for outputting the reverse output of output PE of inverter 4209 to a gate of PMOS 3302 in the storing unit 33. The gates of PMOS 4201 and nMOS 4202 receive a clock signal SCLK of a predetermined duty ratio and generated from a clock generator, not shown, which operates upon an "H" of erase control signal SPER. The source of transfer gate 4210 is connected to the source of nMOS 4205 of the depletion type and the gate of nMOS 4207 of nMOS 4206. The gate of transfer gate 4210 is connected to the power source voltage Vcc.

Next, the configuration of storing unit 33 is explained. EEPROM cell 40 comprises 2 EEPROM cell 40a and 40b, which are connected in parallel. It comprises nMOS 3303 and nMOS 3304 connected in series between the power source voltage Vcc and ground. The source of EEPROM cell 40 is connected to the source of nMOS 3303 and the drain of nMOS 3304. Storing unit 33 further comprises PMOS 3305 and nMOS 3306 connected in series between the power source voltage Vcc and ground. Output PW of inverter 3209 of write circuit 32a are applied to the gates of nMOS 3305 and nMOS 3306. The source of PMOS 3305 and the drain of nMOS 3306 are connected to the gate of nMOS 3304. PMOS 3307 and PMOS 3308 of OR connection, nMOS 39 of the depletion type, nMOSs 38 and 3309 connected in the OR connection and nMOS 3310 are connected between the drain of EEPROM cell 40 and the power source voltage Vcc. The gate of nMOS 3310 receives the output PE of inverter 4209 of erase circuit 32b and the output PW of inverter 3209 of write circuit 32a through NOR circuit 3311. The source of depletion type nMOS 39 is connected to inverter 3312 and the output of inverter 3312 is inverted by inverter 3313. It is also connected to one input terminal of NAND circuit 43 of latch circuit 34. Storing unit 33 further comprises PMOS 3314, depletion nMOS 3315, nMOS 3316 and OR connected nMOSs 3317 and 3318, which are connected in series with each other between power source voltage Vcc and ground. The gate of depletion type nMOS 3315 and nMOS 3316 are connected to the drain of depletion type nMOS 315. The gate of PMOS 3214 receives the signal $\overline{INT}$ through inverters 3301 and 3319 when the signal $\overline{INT}$ generate a falling of pulse upon a rise of the power source voltage Vcc. The output PR of inverter 3301 is input to NOR circuit 3211 of write circuit 32a. The output of inverter 3319 is input to the gates of nMOS 3318 and PMOS 3307. Further, nMOS 3320, nMOS 3302 and nMOS 3321 are connected in series between the power source voltage Vcc and ground. The gate of nMOS 3320 is connected to the drain of depletion type nMOS 3315. The drain of depletion type nMOS 3315 is connected to nMOS 3322 and the other terminal is grounded. The gate of nMOS 3322 receives the other output of inverter 3319. Therefore, the gates of nMOS 3321, nMOS 3322 and nMOS 3318 are connected to the output terminal of inverter 3319 and the source of nMOS 3320 is connected to the gate of EEPROM cells 40a and 40b, and to the drain of nMOS 4207 of erase circuit 32b.

The operations of respective modes comprising a mode for reading data from EEPROM cell 40 (reading mode), a mode for writing the storing data into EEPROM (writing mode) a mode for erasing the stored data from EEPROM (erasing mode), and a mode for writing and reading the data into and from respective EEPROMs in cell matrix (normal mode), are described as follows.

(1) Operation of the reading mode

The reading mode is carried out when the power source voltage Vcc is applied the apparatus body or the write or erase of the stored data (logic state) is performed for EEPROM cell 40 by write erase circuit 32.

First, the signal $\overline{INT}$ produces a falling pulse. During the period "L" of the signal $\overline{INT}$, "L" is applied to respective gates of PMOS 3314, PMOS 3307, nMOS 3318, nMOS 3321 and nMOS 3322 through inverters 3301 and 3319, thereby turning on PMOSs 3314 and 3307 and turning off nMOS's 3318, 3321 and 3322. When PMOS 3314 is turned on, nMOS 3316 is turned on through nMOS 3315 of the depletion type and when nMOS 3316 is turned on, nMOS 3317 is also turned on. The source voltage of the depletion type nMOS 3315 becomes about 2 V and is applied to the gates of nMOS 3320 and nMOS 38. As a result, both nMOS 3320 and nMOS 38 become "ON".

At this time, as signal SPER is set at "L", the output of NAND circuit 37 becomes "H". Further the output PE of inverter 4209 turns to "L" and is applied to the gate of nMOS 4203, thereby turning off nMOS 4203. The output PE of inverter 4209 is reversed by inverter 4211 and "H" is applied to the gate of nMOS 3302, thereby turning on nMOS 3302. Further, the output PE ("L") of inverter 4209 is applied to respective gates of nMOSs 4206 and 4207 through transfer gate 4210, thereby turning off nMOSs 4206 and 4207.

Further, as signal SPWR is set at "L", the output of NAND circuit 36 becomes "H" and the output PW of inverter 3209 becomes "L" and is applied to the gate of nMOSs 3206 and 3207 through the gate of nMOS 3203, one terminal of NOR circuit 3211 and transfer gate 3210, thereby turning off nMOSs 3206 and 3207. At this time, as output PR of inverter 3301 is at "H", the output of NOR circuit 3211 becomes "L" and is applied to the gate of nMOS 3208.

As described above, respective outputs PE and PW of inverters 3209 and 4209 are set at "L". Thus, the output of NOR circuit 3211 becomes "H" and is applied to the gate of nMOS 3310, thereby turning on nMOS 310.

Therefore, as the output PW of inverter 3209 turns to "L", PMOS 3305 turns on and nMOS 3303 and nMOS 3306 turn off. Thus, the source voltage of PMOS 305 becomes "H" and is applied to the gate of nMOS 304, thereby turning on nMOS 3304.

Therefore, as nMOS 3320 is turned on, nMOS 3321 and nMOS 4207 are turned off, and about 2 V is applied to the gate of EEPROM cells 40a and 40b. Then, as nMOS 3304 is turned on, the source voltages of EEPROM cells 40a and 40b become 0 V. Further, as PMOS 3307, depletion type nMOS 39 nMOS 38 and nMOS 3310 are turned on, respective drains of EEPROM cells 40a and 40b and power source voltage Vcc become conductive.

In this case, if EEPROM cells 40a and 40b are at logic "0", i.e., an electron is not injected into the floating gate of EEPROM cells 40a and 40b, both EEPROM cells 40a and 40b are turned on, enabling the voltage "L" to be applied to the inverter 3312.

On the other hand, when EEPROM cells 40a and 40b are at logic "1", i.e., an electron is injected into the floating gate thereof, EEPROM cells 40a and 40b are turned off and the source voltage ("H") of depletion type nMOS 39 is applied to inverter 3312. Therefore, when EEPROM cell 40 is set at logic "0", "L" is applied to one input terminal of NAND circuit 43 of latch circuit 44 through inverters 3312 and 3313. At this time, both SPER and SPWR are set at "L". Thus, the output of NOR circuit 49 becomes "H" and is applied to the other input terminal of NAND circuit 43. Therefore, the output "L" of inverter 3313 is latched at latch circuit 34 and the output SPS of latch circuit 34 is set at "H".

When EEPROM cell 40 is set at logic "1", "H" is applied to one input terminal of NAND circuit 43 of latch circuit 34 through inverters 3312 and 3313. The input "H" is latched by latch circuit 34 and thus the output SPS of latch circuit 34 is set at "L".

(2) Operation of write mode

According to the write mode, a logic "0" is set in EEPROM cells 40a and 40b and the electron is released from the floating gate of EEPROM cells 40a and 40b.

This write mode operation is performed only when SPWR="H", SPER="L" and SPS="H" (SPS="L"), i.e., logic "1" is currently set in EEPROM cells 40a and 40b, i.e., when the setting of the software data protection is requested and the software data protection state is removed.

At this time, as $\overline{SPS}$="H" and SPWR="H", the output of NAND circuit 36 becomes "L". As a result, the output PW of inverter 3209 turns to "H". As the signal $\overline{INT}$ is "H", the output PR of inverter 3301 is "L". Therefore, the output of NOR circuit 3311 becomes "L" and is applied to the gate of the nMOS 3208, thereby turning off nMOS 3208. As the output PW("H") of inverter 3209 is also applied to nMOS 3203, nMOS 3203 is turned on. When SPWR becomes "H", clock SPLK with a predetermined frequency is applied from the not-shown clock generator to the gate of PMOS 3201 and nMOS 3202. Therefore, PMOS 3201 and nMOS 3202 repeat an on and off operation alternately in accordance with clock SCLK. Therefore, one terminal of MOS capacitor 3204 is set at about 5 V (power source voltage Vcc) when PMOS 3201 is turned on, and it is set at about 0 V (ground voltage) when nMOS 3202 and nMOS 3203 are on. Thus, the voltage of one terminal of nMOS capacitor 3204 varies alternately. The output PW ("H") of inverter 3209 is applied to respective gates of nMOS 3206 andS 3207 through transfer gate 3210, thus turning on nMOS 3206 and 3207. Therefore, the source voltage of nMOS 3206 is applied to the drain and source of depletion type nMOS 3206 and the other terminal of nMOS capacitor 3204. Therefore, MOS capacitor 3204 is gradually charged up to the power source voltage Vpp (about 20 V). Therefore, when the voltage of MOS capacitor 3204 increases to the power source voltage Vpp (about 20 V), the source voltage of depletion type nMOS 3205 becomes about 20 V. Thus, the gate voltage of nMOS 3206 and nMOS 3207 becomes about 20 V. Therefore, the power source voltage Vpp (about 20 V) is applied to the drain of EEPROM cells 40a and 40b through nMOS 3207.

When both SPER and SPS are set at "L", the output of NAND circuit 37 becomes "H", thereby setting the output PE of inverter 4209 at "L". The output PE ("L") of inverter 4209 is applied to nMOS 4206 and 4207 through transfer gate 4210. As a result, nMOS 4206 and 4207 are turned off. The output PE("L") of inverter 4209 is reversed by inverter 4211 and it becomes "H", and is thereby applied to the gate of nMOS 3302. nMOS 3302 is turned on. The output PR("L") of inverter 3301 is inverted by inverter 3319 to "H" and is applied to respective gates of PMOS 3314 and nMOSs 3318, 3321 and 3322. As a result, PMOS 3314 is turned off and nMOS 3322 are turned on, thereby enabling "L" to be applied to the gate of nMOS 3320 and nMOS 3316, thus turning off nMOSs 3320 and 3316.

As described above, nMOS 3320 and nMOS 4207 are turned off and nMOS 3302 and nMOS 3321 are turned on, thereby applying "L" to the gates of EEPROM cells 40a and 40b. As described above, PE="L" and PW="H". Thus, the output of the NOR circuit 3311 is turned to "L" and "L" is aplied to the gate of nMOS 3310. Therefore, EEPROM cell 40 is separated from latch circuit 34 by nMOS 3310. Further, as PW is set at "H", PMOS 3305 is turned off and nMOSs 3303 and 3306 are turned on and further PMOS 3305 is turned off, and nMOS 3306 is turned on, thereby turning off nMOS 3304. As a result, Vcc (about 5 V) is applied to the source of EEPROM cells 40a and 40b.

Therefore, about 0 V is applied to the gates of EEPROM cells 40a and 40b, about 20 V to their drains and about 5 V to their sources. The electron is discharged and EEPROM cells 40a and 40b are set at logic "0", resulting in the setting of the software data protection. When EEPROM cells 40a and 40b are set logic "0", and thereafter, the above recited read mode is conducted, the current stored data (logic state "0" = "L") of EEPROM cells 40a and 40b is latched and the output SPS of latch circuit 34 is fixed at "H" and $\overline{SPS}$ is fixed at "L". Therefore, in the later cycle, SPWR = "H" and SPER = "L" are set in order to set the software data protection state, the output of NAND circuit 36 of write erase control circuit 31 is kept at "H" and the output PW of inverter 3209 of write circuit 32a becomes "L". Therefore, nMOSs 3206 and 3207 both turn off and SPWR = "H". Thus, when clock SCLK is generated, a voltage of about 20 V is necessary to discharge the electrons from the floating gate. This voltage is not applied to the drains of EEPROM cells 40a and 40b. Therefore, logic "0" is not rewritten in EEPROM cells 40a and 40b.

(3) An operation of erase mode

According to this erase mode, logic "1" is set at EEPROM cells 40a and 40b, i.e., an electron is injected to the floating gate of EEPROM cells 40a and 40b.

The operation of the erase mode is performed only when the release of the software protection state is requested (when SPWR = "L", SPER = "H" and SPS = "H" ($\overline{SPS}$ = "L")), i.e., only when the request for releasing the software data protection is made when the current EEPROM cells 40a and 40b are set at logic "0", i.e., the state of software data protection is set.

At this time, as SPS = "H" and SPER = "L", the output of NAND circuit 37 becomes "L". As a result, the output PE of inverter 4209 becomes "H" and nMOS 4203 is turned on.

When SPWR becomes "H", a clock SCLK with a predetermined frequency is applied from a clock generator (not shown) to the gate of PMOS 4201 and nMOS 4202. Therefore, PMOS 4201 and nMOS 4202 alternately repeat an on and off operation in accordance with clock SCLK. Therefore, one terminal of MOS capacitor 4204 is set at about 5 V (power source voltage Vcc) when PMOS 4201 is turned on and at about 0 V (ground voltage) when nMOSs 4202 and 4203 are on. Thus, the voltage of one terminal of nMOS capacitor 4204 varies alternately. The output PE ("H") of inverter 4209 is applied to respective gates of nMOS 4206 and 4207 through transfer gate 4210, turning on nMOSs 4206 and 4207. Therefore, the source voltage of nMOS 4206 is applied to the drain and source of depletion type nMOS 4206 and the other terminal of nMOS capacitor 4204. Therefore, MOS capacitor 4204 is gradually charged up (to the power source voltage Vpp about 20 V). Therefore, when the voltage of MOS capacitor 4204 increases to the power source voltage Vpp (about 20 V), the source voltage of depletion type nMOS 4205 becomes about 20 V. Thus, the gate voltage of nMOSs 4206 and 4207 becomes about 20 V. Therefore, the power source voltage Vpp (about 20 V) is applied to the gate of EEPROM cells 40a and 40b through nMOS 4207.

When both SPWR and $\overline{SPS}$ are set at "L", the output of NAND circuit 36 becomes "H", thereby enabling the output PW of inverter 3209 to be set at "L". The output PE ("L") of inverter 3209 is applied to nMOSs 3206 and 3207 through transfer gate 3210. As a result, nMOSs 3206 and 3207 are turned off. The output PW("L") of inverter 3209 is applied to NOR circuit 3211. As $\overline{INT}$ = "H", the output PR of inverter 3301 is turned to "L". Therefore, the output of NOR circuit 3211 becomes "H" and is applied to the gate of nMOS 3208, thereby turning it on.

As described above, PE = "H", PW = "L", and the output of NOR circuit 3211 becomes "L" and is applied to nMOS 3310, thereby turning off nMOS 3310. The drain of EEPROM cells 40a and 40b are separated from the source of nMOS 38 and 3309 by nMOS 3310.

The output PR("L") of inverter 3301 is inverted by inverter 3319 to "H", and applied to respective gates of PMOS 3314 and nMOSs 3318, 3321 and 3322. As a result PMOS 3314 is turned off and nMOS 3322 is turned on. Thus, "L" is applied to the gate of nMOS 3320 and nMOS 3316, thereby turning both of them off. nMOS 3321 is also turned on. Further, the output PE("H") of inverter 4209 is inverted by inverter 4211 to "L" and applied to nMOS 3302, thereby turning off nMOS 3302.

As described above, both nMOSs 3302 and 3320 turn off and about 20 V is applied to the gate of EEPROM cells 40a and 40b through nMOS 4207.

As described above, the output PW of inverter 209 become "L", PMOS 3305 is turned on, and nMOSs 303 and 3306 are turned off. As PMOS 3305 is turned on, nMOS 3304 is turned on. Therefore, the sources of EEPROM cells 40a and 40b are made about 0 V. As described above, the output of NOR circuit 3211 is turned to "H", nMOS 3208 is turned on, thereby turning the drains of EEPROM cells 40a and 40b to about 0 V.

Therefore, the gate of EEPROM cells 40a and 40b are made about 20 V and the source and drain thereof are made to be at about 0 V. Therefore, the electron is injected to the floating gates of EEPROM cells 40a and 40b, thereby setting logic "1" in them. In other words the software data protection is released.

After EEPROM cells 40a and 40b are set in logic "1", the above mentioned read mode operation is performed and the current stored data (logic state "1" = "H") of EEPROM cells 40a and 40b is latched at latch circuit 34 and output SPS of latch circuit 34 is fixed at "L" and $\overline{SPS}$ is fixed at "L". Therefore, even if SPWR = "L" and SPER = "H" are set to remove the software data protection state again, the output of NAND circuit 37 of write erase control circuit 31 is turned to "H" and the output of inverter 4209 of erase circuit 32b is turned to "L". Therefore, both nMOSs 4206 and 4207 are turned off and SPER = "H". Even when the clock SCLK is produced, a voltage of about 20 V, necessary for injecting the electron into the floating gate, is not supplied to the gate of EEPROM cells 40a and 40b. Therefore, logic "1" is not rewritten into EEPROM cells 40a and 40b.

(4) Operation of normal mode

According to this normal mode, read and write of the data for respective EEPROM cells in cell matrix 2 are performed. The operation in this normal mode is not related to the subject of the present invention, but will be explained briefly.

In the normal mode, SPWR = "L" and SPER = "L" and $\overline{INT}$ is set at "H".

As SPWR is set at "L", the output of NAND circuit 36 become "H", regardless of whether SPS is set at "L" or "H", and PW of inverter 3209 turns to "L", thereby turning off nMOSs 3203, 3206 and 3207.

As SPER is set at "L", the output of NAND circuit 37 is made "H" regardless of whether SPS is set at "L"

or "H". As a result, the output PE of inverter 4209 turns to "L" and is applied to respective gate of nMOS 4206 and 4207 through inverters 4211, the gate of nMOS 4203 and transfer gate 4210. As a result, nMOS 4207 is turned off. Further, the output PE of inverter 4209 is inverted to "H" by inverter 4211 and is applied to the gate of nMOS 3302, thereby turning on nMOS 3302.

As the signal INT="H", the output PR of inverter 3301 turns to "L". It is then inverted to "H" by inverter 3319 and applied to respective gates of PMOSs 3314 and 3307 and respective gates of nMOSs 3321, 3318 and 3322. Then both PMOSs 3314 and 3307 are turned off and nMOSs 3318, 3322, and 3321 are turned on, thereby enabling nMOS 3320 and nMOS 38 to be turned off. Therefore, nMOS 3320 is turned off and nMOSs 3302 and 3321 are turned on and, as described above, nMOS 4207 is turned off, thereby enabling about 0 V to be applied to the gate of EEPROM cells 40a and 40b.

As output PW of inverter 3209 is turned to "L", PMOS 3305 is turned on and nMOSs 3303 and 3306 are turned off. Further, PMOS 3305 turns on, thereby turning on nMOS 3304. Therefore, nMOS 3303 is turned off and nMOS 3304 is turned on, and the sources of EEPROM cells 40a and 40b become about 0 V.

As described above, the PW and PER are set at "L" and the output of NOR circuit 3211 becomes "H", thereby turning on nMOS 3208. Therefore, the drains of EEPROM cells 40a and 40b are set at about 0 V. As described above, the gate, source and drain of EEPROM cells 40a and 40b become about 0 V, and the stored data (logic state) of EEPROM cells 40a and 40b do not change. In this normal mode, SPWR="L" and SPER="L". Thus, the NOR circuit 4d of latch circuit 34 becomes "H" and the output of inverter 3313 of storing unit 33 is latched at latch circuit 34. In the normal mode, the potential at the node n2 between inverter 3212 and inverter 3213 is fixed at the logic level which is read from EEPROM cells 40a and 40b in the read mode.

In this case, as both PE and PW become "L", the output of NOR circuit 3211 becomes "H" and nMOS 3310 turns on. Therefore, the source of nMOS 3309 is at about 0 V.

Where the logic level of the node N2 is at "H", PMOS 3308 is turned off and nMOS 3309 is turned on. Therefore, L" is applied to the input terminal of inverter 3312 through nMOSs 3208 and 3310. Therefore, the output of inverter 3312, namely, the potential of node N2, is again set to "H".

Where the logic level of node N2 is "L", PMOS 3308 is turned on and nMOS 3309 is turned off. Therefore, the input terminal of inverter 3212 receives "H" through PMOS 3308 and depletion type 39. Therefore, the output of inverter 3312, namely, the potential of node N2, is again set at "L". Therefore, the potential of node N2 is fixed at the logic level which is read out from EEPROM cells in the read mode.

What is claimed is:

1. An electrically erasable programmable non-volatile semiconductor memory device including an electrically erasable programmable memory cell and a software data protection circuit means, said software data protection circuit means comprising:
   an electrically erasable programmable non-volatile semiconductor memory element;
   means for writing data to and erasing data from said electrically erasable programmable non-volatile memory cell by storing, in said memory element, a) a setting state which prohibits writing data to and erasing data from said memory cell when first addresses and data for setting the setting state are sequentially input and b) a releasing state which allows writing data to and erasing data from said memory cell when second addresses and data for setting the releasing state are sequentially input; and
   a logic state setting control circuit means for prohibiting repeated setting of the setting state when the first addresses and data for setting the setting state are sequentially input, where said semiconductor memory element has already maintained the setting state.

2. The electrically erasable programmable non-volatile semiconductor memory device according to claim 1, wherein said logic state setting control circuit means includes:
   a memory circuit for storing a logic state which is currently stored in said electrically erasable programmable non-volatile semiconductor memory element;
   a logic circuit for outputting a first control signal for setting the setting state to said electrically erasable programmable non-volatile semiconductor memory element when the first addresses and data for setting the setting state are sequentially input; and
   a prohibit circuit for prohibiting said electrically erasable programmable non-volatile semiconductor memory element from being repeatedly set in the setting state when the first control signal for setting the setting state is output from said logic circuit to said electrically erasable programmable non-volatile semiconductor memory element, where said electrically erasable programmable non-volatile semiconductor memory element has already maintained the setting state.

3. The electrically erasable programmable non-volatile semiconductor memory device according to claim 2, wherein said memory circuit includes a latch circuit.

4. An electrically erasable programmable non-volatile semiconductor memory device including an electrically erasable programmable memory cell and a software data protection circuit means, said software data protection circuit means comprising:
   an electrically erasable programmable non-volatile semiconductor memory element;
   means for writing data to and erasing data from said electrically erasable programmable non-volatile memory cell by storing, in said memory element, a) a setting state which prohibits writing data to and erasing data from said memory cell when first addresses and data for setting the setting state are sequentially input and b) a releasing state which allows writing data to and erasing data from said memory cell when second addresses and data for setting the releasing state are sequentially input;
   a logic state setting control circuit means for prohibiting repeated setting of the setting state when the first addresses and data for setting the setting state are sequentially input, where said semiconductor memory element has already maintained the setting state; and
   means for prohibiting repeated setting of the releasing state when the second addresses and data for setting the releasing state are sequentially input, where said electrically erasable programmable non-volatile semiconductor memory element has already maintained the releasing state.

5. The electrically erasable programmable non-volatile semiconductor memory device according to claim 4, wherein said logic state setting control circuit means includes a memory circuit for storing a logic state which is currently stored in said electrically erasable programmable non-volatile semiconductor memory element;

a logic circuit for outputting a first control signal for setting the setting state to said electrically erasable programmable non-volatile semiconductor memory element when the first addresses and data for setting the setting state are sequentially input and for outputting a second control signal for setting the releasing state to said electrically erasable programmable non-volatile semiconductor memory element when the second addresses and data for setting the releasing state are sequentially input; and a prohibit circuit for prohibiting said electrically erasable programmable non-volatile semiconductor memory element from being repeatedly set in the setting state when the first control signal for setting the setting state is output from said logic circuit to said electrically erasable programmable non-volatile semiconductor memory element, where said electrically erasable programmable non-volatile semiconductor memory element has already maintained the setting state and said prohibit current for prohibiting said electrically erasable programmable non-volatile semiconductor memory element from being repeatedly set in the releasing state when the second control signal for setting the releasing state is output from said logic circuit to said electrically erasable programmable non-volatile semiconductor memory element, where said electrically erasable programmable non-volatile semiconductor memory element has already maintained the releasing state.

6. The electrically erasable programmable non-volatile semiconductor memory device according to claim 5, wherein said memory circuit includes a latch circuit.

* * * * *